US006299062B1

United States Patent
Hwang

(12) United States Patent
(10) Patent No.: US 6,299,062 B1
(45) Date of Patent: Oct. 9, 2001

(54) ELECTRONIC CASH SYSTEM BASED ON A BLIND CERTIFICATE

(75) Inventor: Seong Oun Hwang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 09/186,207

(22) Filed: Nov. 4, 1998

(30) Foreign Application Priority Data

Aug. 18, 1998 (KR) .................................................. 98-33521

(51) Int. Cl.$^7$ ...................................................... G06F 17/60
(52) U.S. Cl. ................................. 235/379; 705/44; 380/30
(58) Field of Search ..................................... 235/379–380, 235/381; 902/2, 7, 22, 26, 27–28; 340/825.31, 825.34; 380/30, 23, 24, 49, 25, 50; 705/41–44, 69

(56) References Cited

U.S. PATENT DOCUMENTS

| 4,977,595 | | 12/1990 | Ohta et al. . | |
|---|---|---|---|---|
| 5,224,162 | | 6/1993 | Okamoto et al. . | |
| 5,768,385 | | 6/1998 | Simon . | |
| 5,878,138 | * | 3/1999 | Yacobi | 705/69 |
| 5,901,229 | * | 5/1999 | Fujisaki et al. | 705/69 |
| 5,924,084 | * | 7/1999 | De Rooij | 235/380 |
| 6,076,078 | * | 6/2000 | Camp et al. | 705/69 |

OTHER PUBLICATIONS

Wallet Databases with Observers; David Chaum and Torben Pryds Pedersen; pp. 89–105.
How to Date Blind Signatures; Masayuki Abe and Eiichiro Fujisaki; pp. 244–251.
Electronic Cash on the Internet; Stefan Brands; Oct. 16, 1994; pp. 1–21.

\* cited by examiner

*Primary Examiner*—Karl D. Frech
*Assistant Examiner*—Larry D Taylor
(74) *Attorney, Agent, or Firm*—Antonelli, Terry, Stout & Kraus, LLP

(57) ABSTRACT

An electronic cash system for performing an electronic transaction using an electronic cash, comprises at least one user apparatus each capable of using the electronic cash; an authentication center apparatus, for receiving a user identity information, a corresponding public key along with a certificate issue request from one of the user apparatus and for issuing a certificate for the user apparatus's public key after confirming the identity of the corresponding user; at least one shop apparatus for confirming the identification of the user based on the user apparatus's public key, the corresponding certificate, for producing a challenge value unique to respective transaction using an electronic cash received from the user apparatus and then for confirming the validity of the electronic cash based on a response value from the user apparatus in response to the challenge value, so as to perform an electronic cash transaction with the user apparatus; and at least one bank apparatus for opening an anonymous account to one of the user apparatus and issuing an electronic cash according to the user apparatus's request after confirming the identification of the user based on the user apparatus's public key and the corresponding certificate, and for confirming the validity of an electronic cash received from one of the shop apparatus or the user apparatus so as to credit a corresponding account.

57 Claims, 7 Drawing Sheets

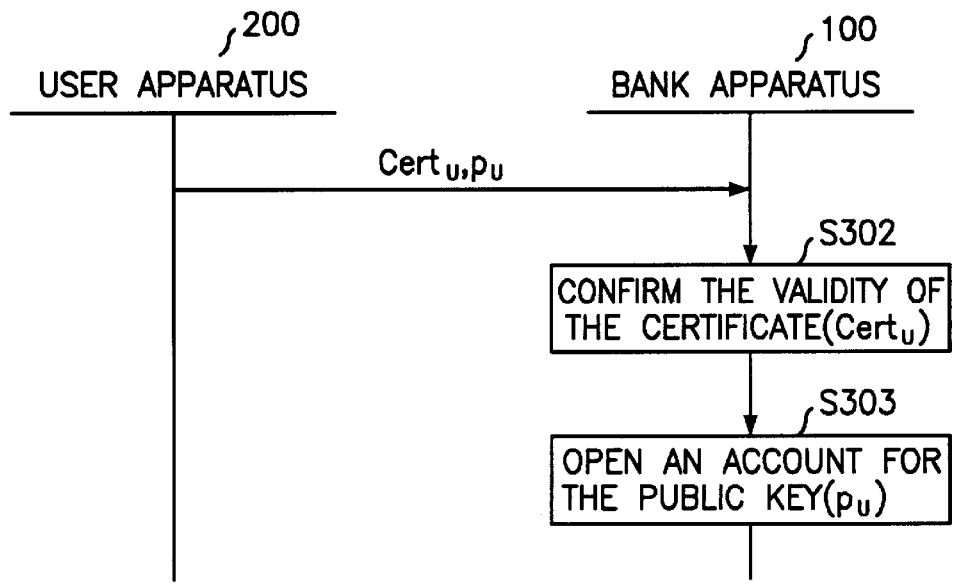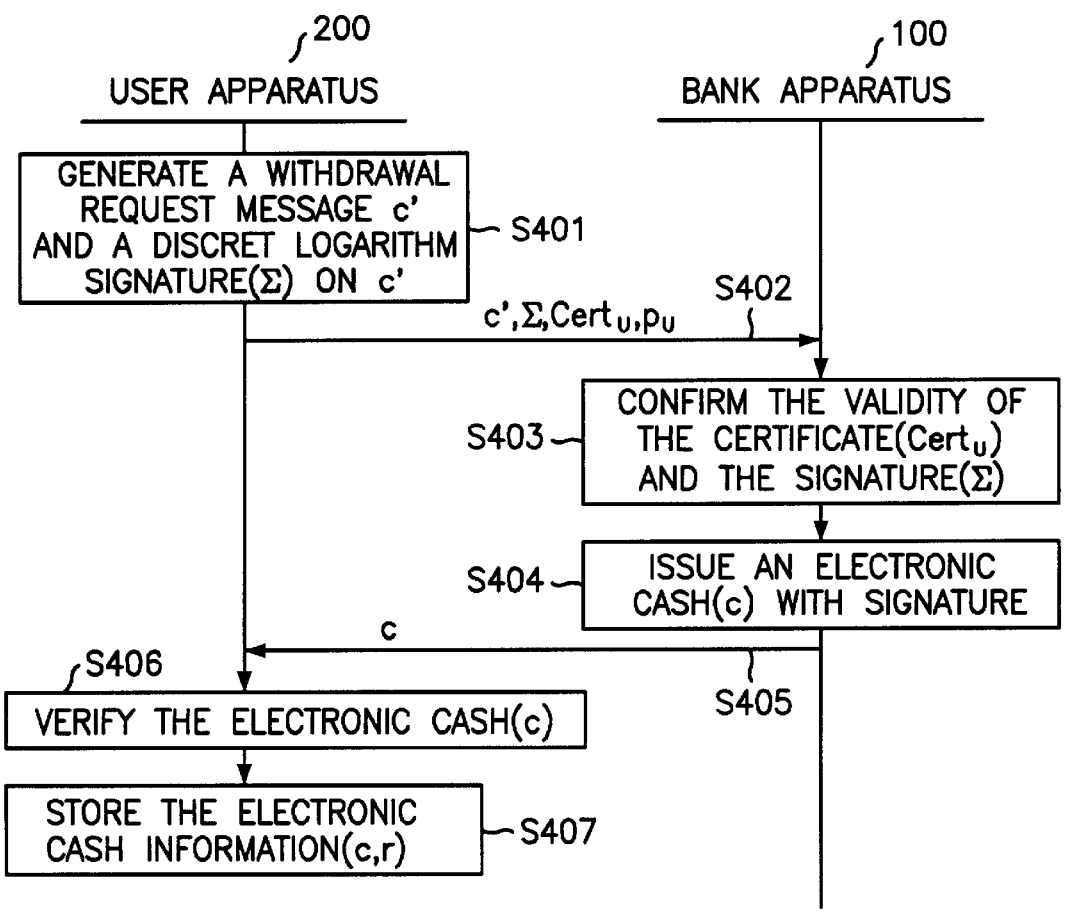

ELECTRONIC CASH SYSTEM BASED ON A BLIND CERTIFICATE

BACKGROUND OF THE INVENTION

The present invention relates to an off-line electronic transaction system which is secured in respect of cryptographics using a telecommunication system or a smart card and an electronic commercial transaction method using the same.

As information-based society has been constructed, the world much depends on network communication. Thus, computer-based technology has greatly affected the access, the storing and the distribution of the information. An electronic commercial transaction is a representative example of such a computer-based technology, which performs a financial transaction by exchanging the electronic informations on communication network.

However, the electronic commercial transaction has problems in that the transmitted information can be illegally captured or transformed by others in open type network such as the Internet, thereby infringing the privacy of the transaction-related parties or causing them to be economically damaged. These problems make a role of hinderance in implementing the electronic commercial transaction. In addition, for the sake of making the electronic commercial transaction popular, the cost for using the electronic commercial transaction should be reduced to be much smaller than the money to be transacted. That is it should be economical. Therefore, in order for activating the electronic commercial transaction, a safe and high efficient electronic transaction system is required.

This electronic transaction system has been implemented an electronic check, a debit-card, a credit card, a stored value card, an electronic cash or the like. The present invention is addressed to the electronic cash, which is able to be electronically implemented by modelling the real cash currently passing in the real world. The real cash has characteristics that it is easy to be carried, easily authenticated, transferable, divisible into small changes, untraceable and anonymous. Thus, it is necessary that the electronic cash should be designed to have the above characteristics. In particular, the untraceability for payment and anonymity among the above characteristics have been much focused on by electronic cash designers.

For providing the untraceability for payment and the anonymity of payer so that a bank apparatus can not find out who have paid to whom, it is necessary that the bank apparatus can not relate a specific withdrawal transaction to a specific account. This can be accomplished by using a special kind of electronic signature called as "blind signature", which has been disclosed in "Blind signatures for untraceable payments", the Proceedings of Crypto'88, pp.199–203, 1983, by D. Chaum.

Also, since the electronic cash is digital data, it may be easily copied to be illegally used in twice or more times. For preventing the multiple use of an electronic cash, in an on-line transaction system, the bank apparatus intervenes the payment so double-spending can be prevented. However, in an off-line transaction system, since the bank does not intervene when a user pays an electronic cash to a shop, it is more difficult to prevent in advance the multiple use (that is, double-spending) of the electronic cash in comparison with that in an on-line transaction system. Only after the electronic cash having been paid by a user is deposited from a shop to a bank, the electronic cash may be examined with a database stored in the bank so as to find out whether the electronic cash has been illegally double-spent. That is to say, in off-line system the electronic cash can be only traced after the fact.

To compensate for this shortage, there has been recently proposed a tamper-resistant device called as "observer", which is issued from a bank and inserted into a payment apparatus of user, so as,to prevent the multiple use of the electronic cash. In this method, the payment of the electronic cash is successfully made with the cooperation of the observer.

SUMMARY OF THE INVENTION

Accordingly, the object of the present invention is to provide an electronic cash system, more specifically an off-line electronic transaction system, an electronic transaction method using the same, and an electronic cash transaction method, in which the electronic cash used in the electronic transaction is untraceable due to the anonymity of payer, transferable to another user, divisible into small changes and preventive of illegally double-spending.

To accomplish the above object, according to one aspect of the present invention, there is provided an off-line electronic transaction system for performing an electronic transaction using an electronic cash, comprising: at least one user apparatus each capable of using the electronic cash; an authentication center apparatus, for receiving a user identity information, a corresponding public key along with a certificate issue request from one of the user apparatus and for issuing a certificate for the user apparatus's public key after confirming the identity of the corresponding user; at least one shop apparatus for confirming the identification of the user based on the user apparatus's public key, the corresponding certificate, for producing a challenge value unique to respective transaction using an electronic cash received from the user apparatus and then for confirming the validity of the electronic cash based on a response value from the user apparatus in response to the challenge value, so as to perform an electronic cash transaction with the user apparatus; and at least one bank apparatus for opening an anonymous account to one of the user apparatus and issuing an electronic cash according to the user apparatus's request after confirming the identification of the user based on the user apparatus's public key and the corresponding certificate, and for confirming the validity of an electronic cash received from one of the shop apparatus or the user apparatus so as to credit a corresponding account.

According to another aspect of the present invention, there is provided an electronic commercial transaction method using an off-line electronic transaction system including at least one user apparatus, an authentication center apparatus, at least one shop apparatus, and a bank apparatus, the method comprising: a first step wherein one of the user apparatus transmits it's identity information along with it's public key, and wherein the authentication center apparatus confirms the identity of the user apparatus, and if valid, then issues a certificate for the user apparatus public key; a second step wherein the user apparatus transmits it's public key and the certificate along with a request of opening an anonymous account to the bank apparatus, and wherein the bank apparatus confirms the validity of the user apparatus public key, and if valid, then opens an anonymous account for the user apparatus; a third step wherein one of the user apparatus withdraws an electronic cash from his account at the bank apparatus and then confirms the validity of the electronic cash; a fourth step wherein the user apparatus transmits it's public key, the certificate and the electronic cash to one of the shop apparatus along with a transaction request, and wherein the shop apparatus confirms the validity of user apparatus, and if valid, then performs the requested transaction with the user apparatus; and a fifth step wherein the shop apparatus transmits a transaction-related record including the electronic cash, the user apparatus public key and the user apparatus public key related to the electronic cash, to the bank apparatus along with a deposit request, and wherein the bank apparatus confirms the validity of the user apparatus public key and the electronic cash and verifies that there is no double-spending of the electronic cash, and if all valid, then credits an account of the shop apparatus by the value of the electronic cash.

According to still anther aspect of the present invention, there is provided an electronic cash transaction method comprising: a certificate issue step wherein an authentication center apparatus different from a bank apparatus issues a certificate to an user apparatus; an account opening step wherein the user apparatus acquires an account from the bank apparatus using the certificate, with the identity of the user apparatus anonymous; an electronic cash withdrawal step wherein the user apparatus withdraws an electronic cash endowed with a signature of the bank apparatus; and an electronic cash payment step wherein the user apparatus uses the certificate and the electronic cash for payment of a specific commercial transaction in off-line state with the shop apparatus.

In accordance with one preferred embodiment, the certificate issue step comprises: a substep wherein the user apparatus generates a secret key and a public key therefore, based on a discrete logarithm signature scheme; a substep wherein the user apparatus transmits the public key thereof, establishing it's identity to the authentication center apparatus; a substep wherein the authentication center generates a certificate for the public key of the user apparatus, using a secret key of the authentication center, the public key of the user apparatus and an identity-related information of the authentication center apparatus; a substep wherein the authentication center apparatus transmits the certificate to the user apparatus; and a substep wherein the user apparatus confirms the validity of the certificate using the public key of the authentication center apparatus, the identity-related information of the authentication center apparatus and the public key of the user apparatus.

Also, in one preferred embodiment of the present invention, the account opening step comprises: a substep wherein the user apparatus transmits the public key of the user apparatus and the corresponding certificate to the bank apparatus; a substep wherein the bank apparatus confirms the validity of the public key of the user apparatus and the corresponding certificate; and a substep wherein, if the public key of the user apparatus and the corresponding certificate are valid, the bank apparatus opens the account for the public key of the user apparatus.

In addition, the electronic cash withdrawal step in one preferred embodiment, comprises: a substep wherein the user apparatus generates a random number of electronic cash and produces an image for the electronic cash random number; a substep wherein the user apparatus generates a message (electronic cash candidate) for electronic cash withdrawal; a substep wherein the user apparatus generates a signature of the user apparatus on the message; a substep wherein the user apparatus transmits the message, the signature of the user apparatus, the public key of the user apparatus and the corresponding certificate; a substep wherein the bank apparatus confirms the validities of the public key of the user apparatus and the corresponding certificate; a substep wherein, if the public key of the user apparatus and the corresponding certificate are valid, the bank apparatus generates a signature of the bank apparatus on the message(electronic cash candidate); a substep wherein the bank apparatus transmits the message with the signature of the bank apparatus to the user apparatus; a substep wherein the user apparatus obtains a bank apparatus signed message from the bank apparatus; and a substep wherein the user apparatus stores the bank apparatus signed message and the random number as an electronic cash.

In another preferred embodiment of the present invention, when the user apparatus is served as a payer and an opposite party of a commercial transaction is served as a payee, the electronic cash payment step comprises: a substep wherein the payer transmits an electronic cash message, it's public key and corresponding certificate, to the payee; a substep wherein the payer confirms the validity of the payer's public key and the corresponding certificate; a substep wherein the payer transmits a payee's account number at the bank apparatus and a transaction time, to the payer; a substep wherein the payee produces a challenge value based on the electronic cash message, the payee's account number at the bank apparatus and the transaction time; a substep wherein the payer produces the challenge value based on the electronic cash message, the payee's account number at the bank apparatus and the transaction time; a substep wherein the payer computes a response value for the challenge value using a random number related to the electronic cash, the challenge value and a secret key of the payer; a substep wherein the payer transmits the response value to the payee; a substep wherein the payee confirms the validity of the response value; and a substep wherein, if the response value is valid, the payee accepts the electronic cash.

In addition, the electronic cash transaction method further comprises an electronic cash settlement step wherein a payee having received the electronic cash provides a record related to the electronic cash transaction to the bank apparatus so as to credit the value of the electronic cash to an account of the payee. In this case, assuming that the user apparatus is called as a payer, the electronic cash settlement step comprises: a substep wherein the payee transmits an electronic cash message, a public key of the payer and a corresponding certificate, a challenge value, a transaction time, a payee's account number and a response value, to the bank apparatus; a substep wherein the bank apparatus confirms the validity of the payer's public key and the corresponding certificate and the validity of the response value; and a substep wherein the bank apparatus checks whether the electronic cash is stored in a deposit database of the bank apparatus.

According to one preferred embodiment of the present invention, the electronic cash payment step is made such that the electronic cash possessed by the user apparatus as the payer is divided into multiple ones and then some of them are used for payment. In this case, the electronic cash payment step may comprises: a substep wherein the payer selects a payment electronic cash random number $r_1$ and a remnant electronic cash random number $r_2$; a substep wherein the payer generates images $r_1'$, $r_2'$ for the payment electronic cash random number and the remnant electronic cash random number; a substep wherein the payer produces an electronic cash message signature d based on the electronic cash message c, the electronic cash random number image r', the value A of the electronic cash, the payment electronic cash random number image $r_1'$, the value of the payment electronic cash $A_1$ and the remnant electronic cash random number image $r_2'$, and generates an electronic cash message signature response value z based on the electronic cash message signature d, the secret key of the payer $s_U$ and the electronic cash random number r; a substep wherein the payer transmits the electronic cash message c, the electronic cash random number image r', the value A of the electronic cash, the payment electronic cash random number image $r_1$', the value $A_1$ of the payment electronic cash, the remnant electronic cash random number image $r_2$', the electronic cash message signature d, the public key of the payer $P_U$ and the corresponding certificate $Cert_U$, to the payee; a substep wherein the payee confirms the validity of the payer's public key and the corresponding certificate; a substep wherein the payee transmits a payee's account number and the transaction time; a substep wherein the payee produces a challenge value $d_1$ based on the payment electronic cash random number image $r_1$', the value $A_1$ of the payment electronic cash, the account number $A_S$ of the payee and the transaction time; a substep wherein the payer computes a response value $z_1$ based on the payment electronic cash random number image $r_1$', the value $A_1$ of the payment electronic cash, the account number $A_S$ of the payee and the transaction time, the secret key $s_U$ of the payer and the electronic cash random number r; a substep wherein the payer transmits the response value to the payee; a substep wherein the payee confirms the validity of the response value $z_1$; and a substep wherein, if the response value is valid, the payee accepts the electronic cash.

In one preferred embodiment, there may be two or more user apparatuses each performing the certificate issue step and the account opening step and one of them is served as an assigner(or transferer) and another is served as an assignee(or transferee), and the electronic cash transaction method may further comprise an electronic cash transfer step wherein the assigner transfers it's own electronic cash to the assignee. At this time, the electronic cash transfer step comprises: a substep wherein the assignee withdraws a vacant electronic cash $c_{U2,z}$ from the bank apparatus; a substep wherein the assigner transmits to the assignee the electronic cash message $c_{U1}$, an assigner's public key $p_{U1}$ and corresponding certificate $Cert_{U1}$ and an electronic cash random number image w; a substep wherein the assignee confirms the validity of the assigner's public key $p_{U1}$ and the corresponding certificate $Cert_{U1}$; a substep wherein the assignee confirms the validity of the received electronic cash message $c_{U1}$; a substep wherein, if the assigner's public key and the corresponding certificate, and the received electronic cash are valid, the assignee produces a challenge value d; a substep wherein the assignee transmits to the assigner the vacant electronic cash message $c_{U2,z}$, an assignee's public key $p_{U2}$ and corresponding certificate $Cert_{U2}$, a transaction time and a vacant electronic cash random number image w*; a substep wherein the assigner confirms the validity of the assignee's public key and the corresponding certificate; a substep wherein the assigner confirms the validity of the vacant electronic cash from the assignee; a substep wherein the assigner computes a challenge value d based on the electronic cash message $c_{U1}$, the transaction time, the vacant electronic cash message $c_{U2,z}$; a substep wherein the assigner produces a response value based on the challenge value d, an assigner's secret key SU1 and the electronic cash random number r; a substep wherein the assigner transmits the response value to the assignee; and a substep wherein the assignee confirms the response value.

Further, the electronic cash transaction method further comprises a transferred electronic cash payment step wherein the assignee as payer uses the electronic cash to a payee for payment of a commercial transaction. Here, the transferred electronic cash payment step comprises: a substep wherein the payer transmits an electronic cash transfer record $H_{1,2}$ to the payee; a substep wherein the payee confirms the validity of the assigner's public key and the corresponding certificate; a substep wherein the payee confirms the validity of the payer's public key and the corresponding certificate; a substep wherein the payee confirms the validity of the transferred electronic cash; a substep wherein the payee transmits a payee's account number and a transaction time related to this payment; a substep wherein the payer produces a challenge value and corresponding response value using the payee's account number, the transaction time for this payment, and the vacant electronic cash message; a substep wherein the payer transmits the response value to the payee; and a substep wherein the payee confirms the validity of the response value.

BRIEF DESCRIPTION OF THE DRAWINGS

For a more complete understanding of the present invention and the advantage thereof, reference is now made to the following description taken in conjunction with the accompanying drawings in which:

FIG. 3 is a flowchart for illustrating the account opening protocol of the electronic commercial transaction method according to the present invention;

FIG. 4 is a flowchart for illustrating the electronic cash withdrawing protocol of the electronic commercial transaction method according to the present invention;

DETAILED DESCRIPTION OF THE INVENTION

Hereinafter, the preferred embodiments of this invention will be in detail explained with reference to the accompanying drawings.

Figure 1:
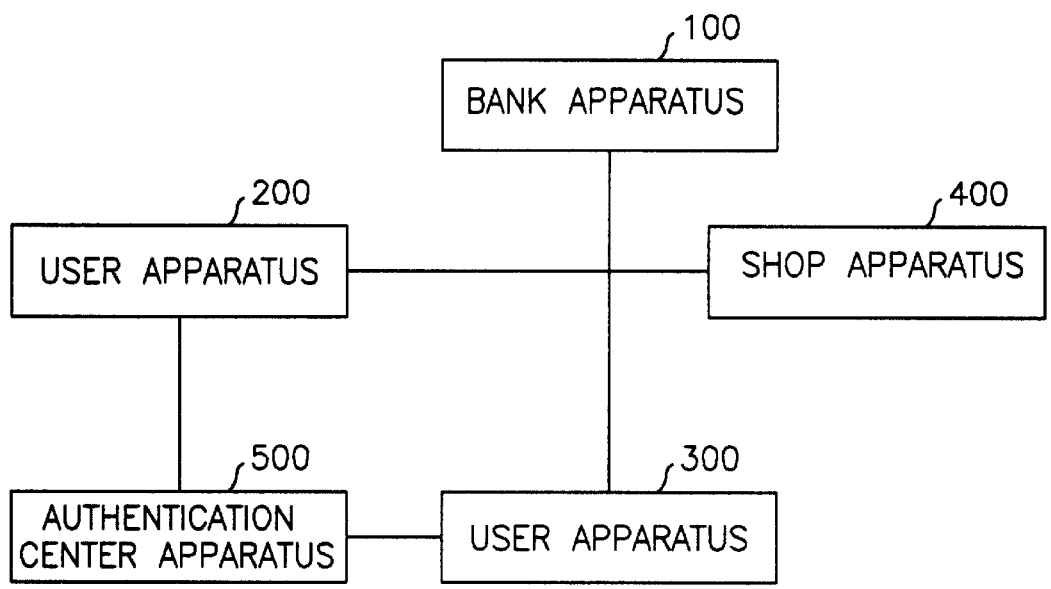
FIG. 1 is a configuration view of an off-line electronic transaction system according to the present invention.

FIG. 1 is a configuration diagram of an off-line electronic transaction system according to one preferred embodiment of the present invention.

Referring to FIG. 1, the electronic transaction system in accordance with the present invention, includes a bank apparatus 100, at least one user apparatus 200 and 300, a shop apparatus 400 and an authentication center apparatus 500.

The user apparatus 200 or 300 is selectively coupled to the authentication center apparatus 500, the bank apparatus 100 and the shop apparatus 400 for performing the respective protocols in the electronic transaction method according to the present invention. When the user apparatus 200 or 300 requests a certificate while he(or she) provides his(or her) personal information including an user public key for identifying himself(or herself), the authentication center apparatus 500 confirms the identity of the user apparatus and then issues an anonymous certificate for the user public key. The shop apparatus 400 receives an electronic cash, a public key of the user apparatus 200 or 300 and an anonymous certificate from the user apparatus 200 or 300, calculates a challenge value which is unique in every transaction, confirms the electronic cash based on the challenge value, and then provides to them a goods or a service required by the user apparatus 200 or 300 to them. The bank apparatus 100 opens an anonymous account for the user apparatus 200 or 300 based on the public key of the user apparatus 200 or 300 and its corresponding certificate, issues an electronic cash on the request of the user apparatus 200 or 300, and receives an electronic cash from the shop apparatus 400 so as to increase the account for the shop apparatus 400 by the amount corresponding the received electronic cash. These apparatus can be connected through a telecommunication network. Also, the user apparatus 200 or 300 can be implemented as a smart card, which is portable, so that a user can use it in a shop for payment.

At this time, the user apparatus 200 or 300 can be implemented as a computing apparatus such as an IC card reader or any other computing device having the IC card capability, which is capable of generating a random number and has a cryptographic operation capability of exponential operation, or the like. The shop apparatus 400 can be implemented by a computing device such as an IC card terminal or the like. If the user apparatus 200 or 300 wants to withdraw an electronic cash from the bank apparatus 100, the user apparatus 200 or 300 generates a discrete logarithm type signature $\Sigma$, and then transmits it along with the public key and the anonymous certificate therefor.

In the meantime, when the user apparatus 200 or 300 requires a certificate to be issued, the authentication center apparatus 500 generates an anonymous certificate and saves or keeps the personal information of the user apparatus 200 or 300, the corresponding public key transmitted from the user apparatus, and the issued anonymous certificate, which can be used in order for tracing the user apparatus, when unfair electronic transaction such as double-spending of the electronic cash is made, In addition, when the user apparatus 200 or 300 requires the withdrawal of the electronic cash, the bank apparatus 100 makes a signature on the electronic cash candidate and then transmits it to the user apparatus 200 or 300, for the sake that the withdrawn electronic cash has an user-anonymity, thereby preventing it from being traced.

The operation of thus-configured electronic transaction system of the present invention will be briefly explained. When the user apparatus 200 or 300 registers his(or her) own public key, the authentication center apparatus 500 issues an anonymous certificate to the user apparatus 200 or 300. The bank apparatus 100 issues a specific value of electronic cash on the request of the user apparatus 200 or 300. The user apparatus 200 or 300 can divide the electronic cash into multiple ones for payment to the shop apparatus 400, until the value of the electronic cash is drenched to zero. Also, the shop apparatus 400 can deposit the electronic cash paid by the user apparatus 200 or 300, to the bank apparatus 100.

The electronic commercial transaction method in accordance with the above electronic transaction system of the present invention includes a certificate issue protocol, an account opening protocol, an electronic cash withdrawal protocol, an electronic cash payment protocol and an electronic cash deposit protocol.

In the certificate issuing protocol, when the user apparatus 200 or 300 transmits his(or her) personal information including his(or her) public key with the request of issuing an anonymous certificate, the authentication center apparatus 500 confirms the identity of the user apparatus and then issues an anonymous certificate for the public key provided from the user apparatus 200 or 300.

In the account opening protocol, when the user apparatus 200 or 300 sends the anonymous certificate along with his public key to the bank apparatus 100 and requests an opening of an anonymous account for him, the bank apparatus 100 confirms that the public key has been registered to the authentication center apparatus 500, so as to give an anonymous account to the user apparatus.

In the electronic cash withdrawal protocol, if the user apparatus 100 sends a withdrawal request to the bank apparatus, the bank apparatus 100 confirms the user apparatus 200 or 300. Assuming that the withdrawal request of the user apparatus is legal, the bank apparatus 100 issues a valid electronic cash to the user apparatus and debits the user's account by the value of the issued electronic cash.

In the electronic cash payment protocol, when the user apparatus 200 or 300 transmits the electronic cash, his public key and the anonymous certificate to the shop apparatus 400 while ordering a goods or a service, the shop apparatus 400 confirms the validation of the electronic cash and then provides the ordered goods or service to the user.

In the electronic cash deposit protocol, the shop apparatus 400 transmits the electronic cash received from the user, the public key for the user and the corresponding certificate to the bank apparatus 100, along with the deposit request of the received electronic cash. The bank apparatus 100 checks whether the public key and the electronic cash are valid and there is no double spending of the electronic cash, based on the information received from the shop apparatus 400. If the deposit request is legal, the bank apparatus credits the shop's account by the value corresponding the electronic cash.

The electronic transaction method in accordance with the present invention, also includes a dividable electronic cash payment protocol, an electronic cash transfer protocol and a transferred electronic cash payment protocol.

In the dividable electronic cash payment protocol, the user apparatus can divide the electronic cash into multiple ones such that the sum of the values of the divided multiple electronic cashes is equivalent to the value of the original electronic cash. Then the user apparatus 200 or 300 uses one divided electronic cash for payment to the shop apparatus 400.

In the transferred electronic cash payment protocol, the transferred electronic cash from another user apparatus 200 or 300 can be used for payment to the shop apparatus 400.

Here, the bank apparatus 100 and the authentication center apparatus 500 can be operated based on the RSA method. The public key, the public modulus and the secret key of the bank apparatus 100 are $e_B$, $n_B$ and $d_B$, respectively, satisfying the condition of $e_B \cdot d_B = 1 \mod \phi(n_B)$, and the public key, the public modulus and the secret key of the authentication center apparatus are $e_{CA}$, $n_{CA}$ and $d_{CA}$, respectively, satisfying the condition of $e_{CA} \cdot d_{CA} = 1 \mod \phi(n_{CA})$, wherein '$\phi$' represents the Euler totient function. In addition, "h" represents a time collision preventive one-way function, and the public keys are publicly available for the electronic transaction related entities. The bank apparatus 100 prepares several public/secret key pairs used to issue different value of electronic cash.

Thus electronic transaction method of the present invention will be in detail explained with reference to FIGS. 2 to 9.

In this figures, one entity is disposed at the left side while another entity is disposed on the right side and the transfers of information from one entity to another are indicated by left-oriented arrows and right-oriented arrows. The information being transferred from one entity to another is symbolically summarized over the respective arrows.

Figure 2:
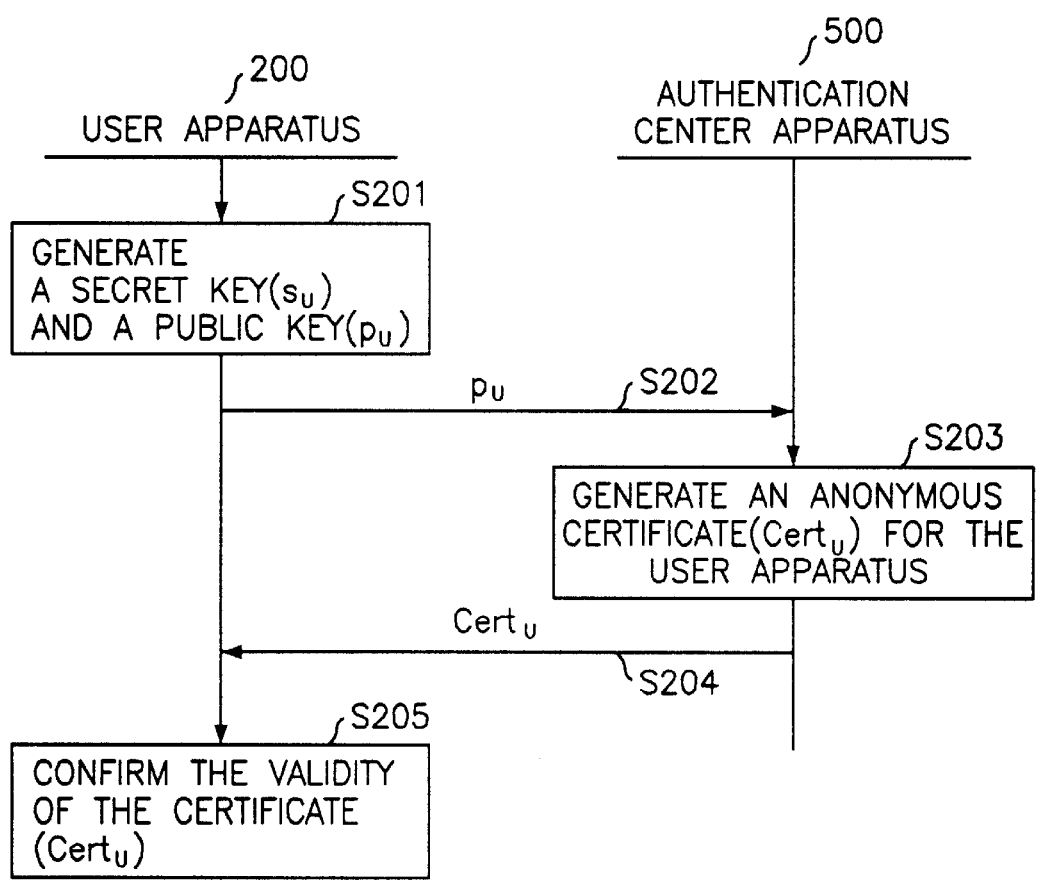
FIG. 2 is a flowchart for illustrating the certificate issuing protocol of the electronic commercial transaction method according to the present invention.

FIG. 2 is a flowchart for illustrating the certificate issuing protocol of the user apparatus 200 in the electronic commercial transaction method in accordance with one preferred embodiment of the present invention.

Referring to FIG. 2, the certificate issuing protocol is for issuing an anonymous certificate to a user apparatus 200. First, in step S201, the user apparatus 200 selects his(or her) own secret key $s_U$ and generates his (or her) own public key $p_U$ related to the secret key $s_U$ in accordance with the discrete logarithm signature scheme, and then sends the public key $p_U$ along with the certificate issue request to the authentication center apparatus 500 in step S202. In step S203, the authentication center apparatus 500 generates an anonymous certificate $Cert_U$ for the user's public key $p_U$ and then transmits the generated anonymous certificate $Cert_U$ to the user apparatus 200 in step S204. In step S205, the user apparatus 200 confirms the validity of the certificate $Cert_U$.

In step S201, the user apparatus 200 can use a discrete logarithm signature scheme such as Schnorr (C. P. Schnorr, "Efficient Signature Generation By Smart Cards", J. of Cryptology, 4-3, pp. 161–174, 1991), DSA (Digital Signature Algorithm), KDSA(Korean Digital Signature Algorithm), or the like, for the sake of generating the pair of his public key/secret key. More specifically, the user apparatus 200 selects his secret key $s_U$ randomly from the set $\{1, \ldots q\}$ and calculates his public key $p_U$ in accordance with the equation of $p_U = g^{-s_U} \bmod p$. Here, p and q are prime numbers the size of which are preferably 512 bit, 140 bit or more, respectively. Also, q is dividable by p-1 and g is a generator for the subgroup G(q) of $Z^*_p$. In step S202, the user apparatus 200 also transmits his personal information for identifying him, along with the his public key $p_U$ and the certificate issue request.

On the other hand, the authentication center apparatus 500 identifies the user apparatus 200 based on the transmitted personal information from the user apparatus 200, before performing step S203. If the user apparatus 200 is identified, the authentication center apparatus 500 generates the certificate $Cert_U$ based on the user's public key $p_U$ the identity-related information $ID_{CA}$ of the authentication center apparatus 500 in accordance with the following equation $Cert_U = h(ID_{CA}\|p_U)^{d_{CA}} \bmod n_{CA}$ in step S203, so as to transmit it to the user apparatus 200. In addition, the authentication center apparatus 500 stores the user's public key $p_U$ the certificate $Cert_U$ along with the personal information of the user apparatus. These data will be possibly used for tracing the user in the electronic transaction system when an illegal transaction such as a double spending of electronic cash is made. In step S205, the user apparatus 200 confirms the validity of the certificate $Cert_U$ received from the authentication center apparatus 500 using the equation $[Cert_U]^{e_{CA}} \bmod n_{CA} = h(ID_{CA}\|p_U)$.

Here, the certificate issued by the authentication center apparatus 500 to the user apparatus 200 makes a role to correlate the user's public key with the identification of the user. In other words, the certificate indicates that the related public key is registered in the authentication center apparatus 500. However, this correlation is maintained secret from others except for the authentication center apparatus 500, so that anyone but for the authentication center apparatus 500 can not find out the identity of the user based on the public key or the certificate.

FIG. 3 is a flowchart for illustrating the account opening protocol in the electronic commercial transaction method according to one preferred embodiment of the present invention.

Referring to FIG. 3, the account opening protocol is for opening an account for the user apparatus 200 at the bank apparatus 100. First, in step S301 the user apparatus 200 transmits his public key $p_U$ and the related certificate $Cert_U$ to the bank apparatus 100, without providing his personal information. In step S302, the bank apparatus 100 confirms the validity of the certificate $Cert_U$ by determining whether the equation $[Cert_U]^{e_{CA}} \bmod n_{CA} = h(ID_{CA}\|p_U)$ is satisfied. That is, the bank apparatus 100 checks whether the user's public key is registered in the authentication center apparatus 500. If the certificate $Cert_U$ is valid, the bank apparatus 100 opens an account for the public key $p_U$ of the user apparatus 200, in step S303. Thus, through this account opening protocol, the user apparatus 200 acquires an anonymous account which is used for depositing or withdrawing electronic cashes, from the bank apparatus 100.

FIG. 4 is a flowchart for illustrating the electronic cash withdrawal protocol in the electronic commercial transaction. This electronic cash withdrawal protocol is for withdrawing an electronic cash from the user's account corresponding the user's public key $p_U$ and this protocol is performed the following steps between the user apparatus 200 and the bank apparatus 100.

Referring to FIG. 4, first, the user apparatus 200 generates a random number r among the set $\{1, \ldots, q\}$ and then generates an image r' in accordance with the equation $r^* = g^r \bmod p$. Also, the user apparatus 200 generates an electronic cash candidate c' using the equation $c' = h(r'\|p_U) \bmod n_B$, in step S401. The user apparatus 200 also generates a discrete logarithm signature $\Sigma$ for the electronic cash candidate c'. Then, in step S402 the user apparatus 200 transmits the electronic cash candidate and the discrete logarithm signature $\Sigma$ along with the user's public key $p_U$ and the certificate $Cert_U$, to the bank apparatus 100.

In step S403, the bank apparatus 100 confirms the validity of the certificate $Cert_U$ transmitted from the user apparatus 200 by ascertaining that the equation $Cert_U^{e_{CA}} \bmod n_{CA} = h(ID_{CA}\|p_U)$ is satisfied. The bank apparatus 100 also confirms the validity of the discrete logarithm signature $\Sigma$ based on the user's public key $p_U$. If the user's public key $p_U$ is valid, the bank apparatus 100 generates an electronically signed cash c in accordance with the equation $c = [c']^{d_B} \bmod n_B$, which is made by electronically signing the electronic cash candidate c'. Then in step S405, the bank apparatus 100 transmits the electronically signed cash c to the user apparatus 200 and debits the value of the generated electronic cash from the user's account.

In step S406, the user apparatus 200 obtains an electronic cash c from the bank apparatus 100, such that $c = [h(r'\|p_U)]^{d_B} \bmod n_B$, and the user apparatus 200 confirms the validity of the electronic cash c by checking that $c^{e_B} \bmod n_B = h(r'\|p_U)$. If the electronic cash c is valid, then in step S407 stores the electronic cash c along with r, that is stores $\{c, r\}$.

At this time, the user apparatus 200 may pre-compute, especially in off-line state from the bank apparatus 100, the random number r and its image r', which are necessary for withdrawing an electronic cash from the bank apparatus 100, so as to use the pre-computed image for the withdrawal protocol, thereby reducing the load of the user apparatus 200 during the withdrawal protocol.

Figure 5:
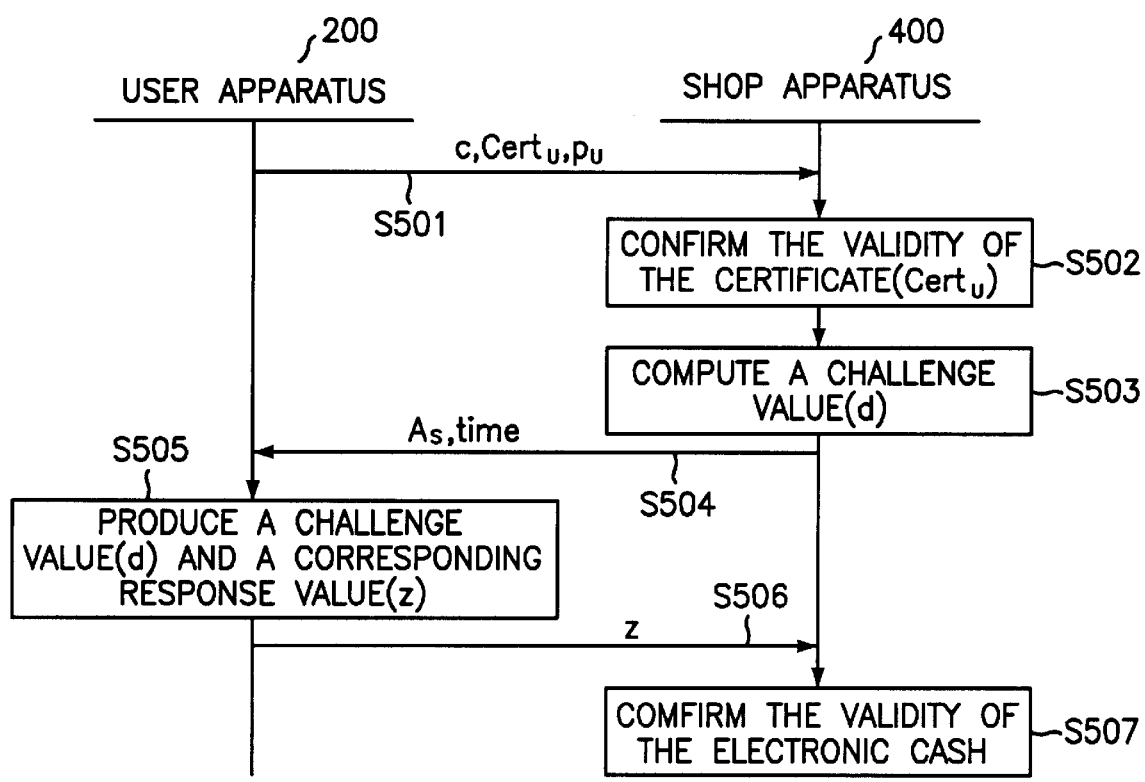
FIG. 5 is a flowchart for illustrating the electronic cash payment protocol of the electronic commercial transaction method according to the present invention.

FIG. 5 is a flowchart for illustrating the electronic cash payment protocol in the electronic commercial transaction method of one preferred embodiment of the present invention. Especially this protocol is for paying goods or services with the electronic cash without any division of the electronic cash. In other words, the electronic cash is used for paying the value as it represents.

Referring to FIG. 5, the following steps are performed when the user apparatus 200 pays the shop apparatus 400 the value A of electronic cash c. That is, the user apparatus 200 is representative of payer and the shop apparatus 400 is representative of payee.

First, the user apparatus 200 transmits the electronic cash c, the user's public key $p_U$ and the certificate $Cert_U$ to the shop apparatus 400 in step S501. Then, the shop apparatus 400 confirms the validity of the certificate by ascertaining that the equation $Cert_U{}^{e_{CA}} \bmod n_{CA} = h(ID_{CA} \| p_U)$ is satisfied in step S502. In step S503, the shop apparatus 400 calculates a challenge value d in accordance with $d = h(A_S \| time \| c)$ and then in step S504 transmits the shop's account number $A_S$ and the time at which the transaction is made, to the user apparatus 200.

Then, the user apparatus 200 computes the challenge value d and a response value z in accordance with $d = h(A_S \| time \| c)$, $z = (r + S_u d) \bmod q$, respectively, in which the challenge value is similarly computed in the shop apparatus, and then in step S506 the user apparatus 200 transmits the response value z to the shop apparatus 400. In step S507, the shop apparatus 400 generates a medium value w according to the equation $w = g^z p_U{}^d \bmod p$ using the received information from the user apparatus 200 and confirms the validity of the electronic cash received from the user apparatus 200 by ascertaining that the equation $c^{e_B} \bmod n_B = h(w \| p_U)$ is satisfied. If the received electronic cash from the user apparatus 200 is valid, the shop apparatus 400 accepts the electronic cash and provides a requested goods or service to the user.

Figure 6:
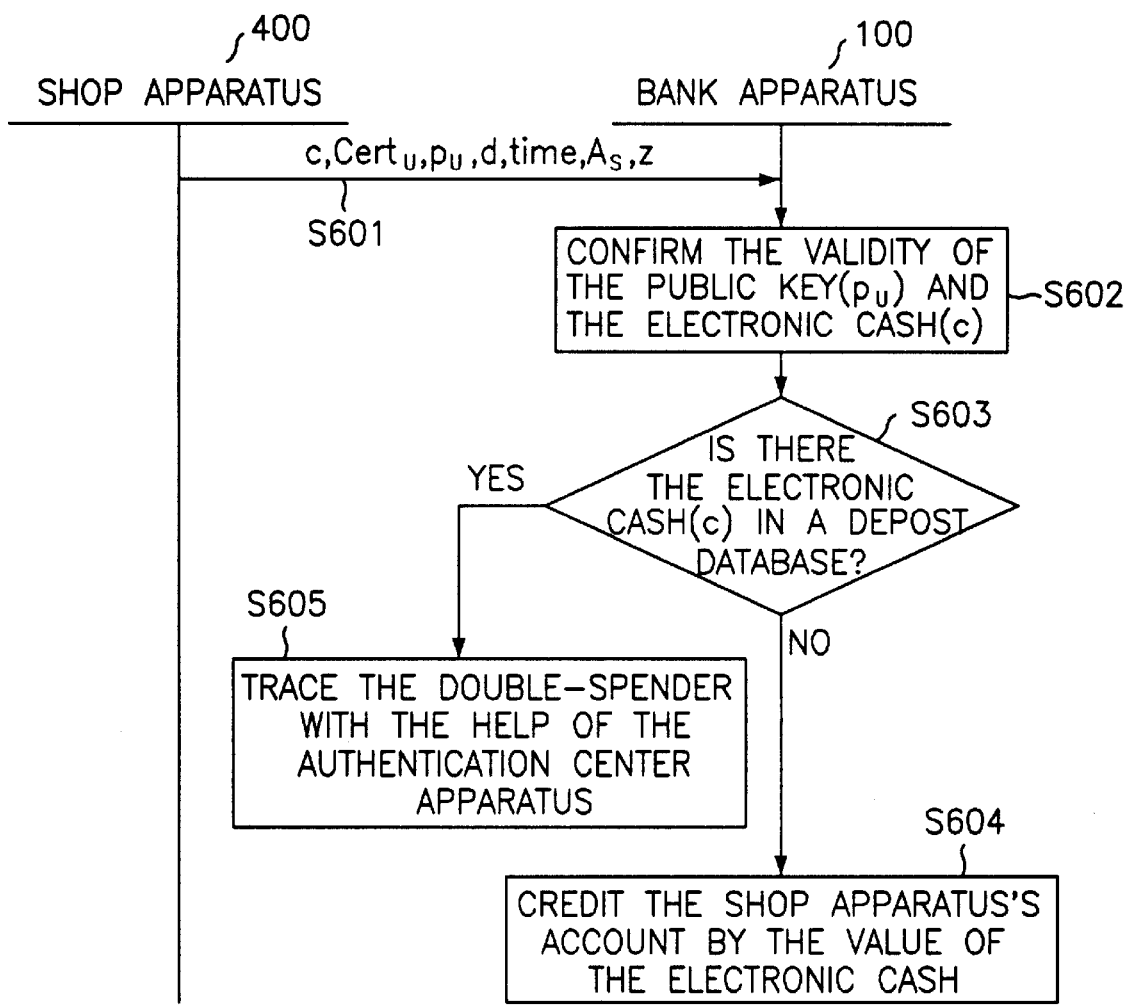
FIG. 6 is a flowchart for illustrating the electronic cash deposit protocol of the electronic commercial transaction method according to the present invention.

FIG. 6 is a flowchart for illustrating the electronic cash deposit protocol in the electronic commercial transaction method according to one preferred embodiment of the present invention.

Referring to FIG. 6, the electronic cash deposit protocol is initiated at step S601, in which the shop apparatus 400 transmits the electronic cash c and the related data $Cert_U$, $p_U$, d, time, $A_S$, z to the bank apparatus 100, along with the deposit request. Then, the bank apparatus 100 in step S602, computes the challenge value d and the medium value w according to the equations $d = h(A_S \| time \| c)$ and $w = g^z p_U{}^d \bmod p$ and then confirms the validities of the certificate $Cert_U$, the user's public key $p_U$ and the electronic cash c by ascertaining that the equations $Cert_U{}^{e_{CA}} \bmod n_{CA} = h(ID_{CA} \| p_U)$ and $c^{e_B} \bmod n_B = h(w \| p_U)$ are satisfied. Subsequently, in step S603 the bank apparatus 100 checks whether the electronic cash received from the shop apparatus 400 is stored in a deposit database of the bank.

If the check result of step S603 represents that the electronic cash received from the shop apparatus 400 is not stored in the deposit database of the bank, the bank apparatus 100 credits the shop's account by the value of the electronic cash c in step S604 and stores the transaction related data to the database. On the other hand, if the electronic cash received from the shop apparatus 400 is detected at the deposit database of the bank, which means "double-spending", the bank apparatus 100 does not accept the electronic cash and may trace a double-spender of the electronic cash with the help of the authentication center apparatus 500.

At this time, the tracing to the double spender is made such that the bank apparatus finds out the secret key $s_U$ of the double spending user using the different values d and d' and corresponding response values z and z', wherein $z = (r + s_U d) \bmod q$ and $z' = (r + s_U d') \bmod q$, according to the equation $s_U = (z - z')/(d - d') \bmod q$, and then provides the secret key $s_U$ to the authentication center apparatus 500.

Figure 7:
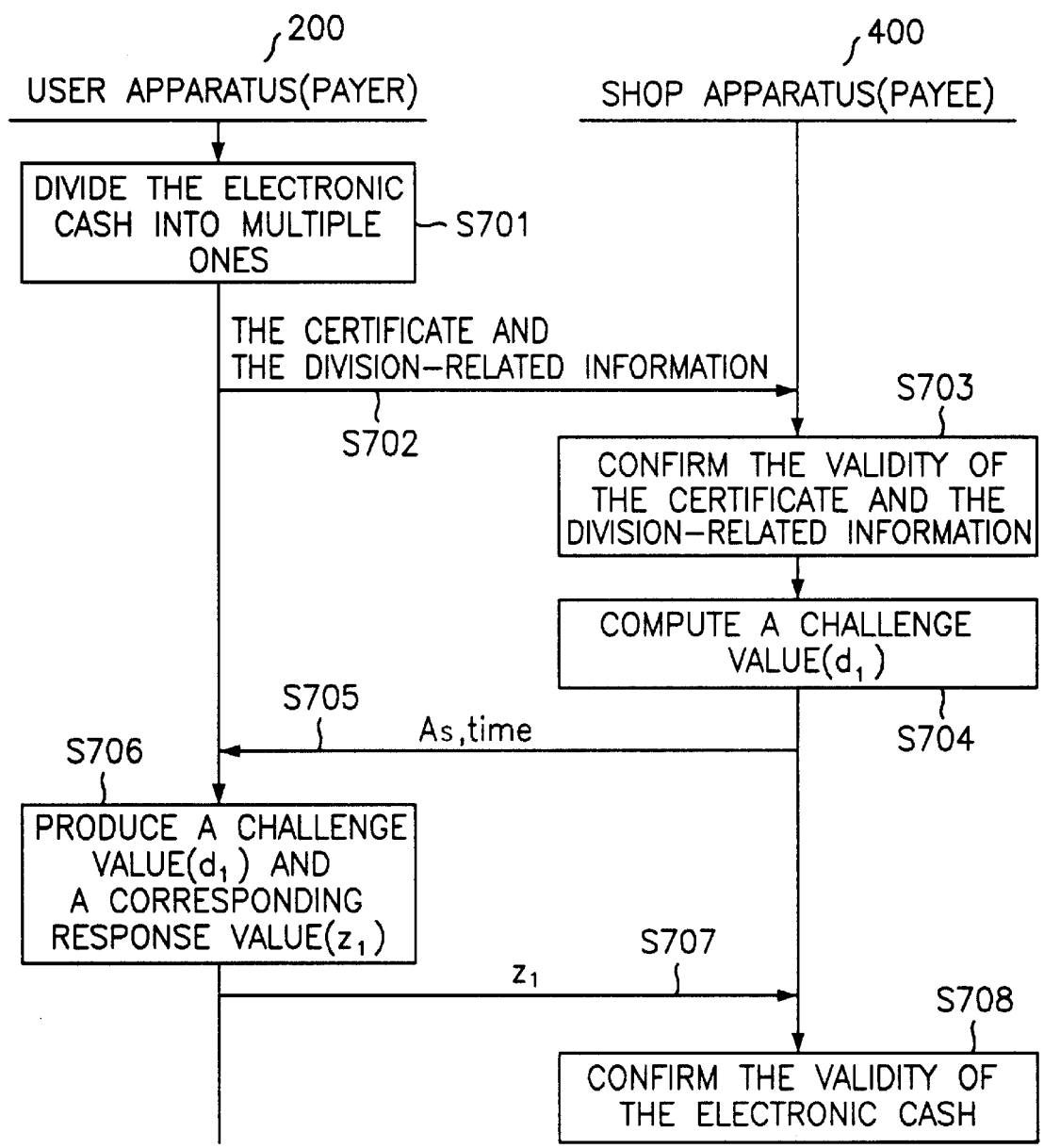
FIG. 7 is a flowchart for illustrating the electronic cash divisible payment protocol of the electronic commercial transaction method according to the present invention.

FIG. 7 is a flowchart for illustrating the dividable electronic cash payment protocol in the electronic commercial transaction method according to one preferred embodiment of the present invention. By this protocol, the user apparatus 200 can divide the electronic cash into multiple electronic cashes such that the sum of the value of the divided multiple electronic cashes is equivalent to the value of the original electronic cash. This protocol can be made based on the Schnorr signature scheme. Here, the user apparatus 200 is representative of payer and the shop apparatus 400 is representative of payee.

Here, it is assumed that the user apparatus 200 intends to pay the value $A_1$, which is smaller than the value A of the electronic cash c, to the shop apparatus 400. For doing this, the electronic cash c should be divided into two electronic cashes $c_1$ and $c_2$ corresponding to the values $A_1$ and $A_2$, respectively, wherein $A_2$ is equal to $A - A_1$.

Referring to FIG. 7, the dividable electronic cash payment protocol is performed as follows.

First, the user apparatus 200 divides the electronic cash c into multiple electronic cashes in step S701, and then in step S702 transmits one of the divided electronic cash and the related information to the shop apparatus 400. In step S703, the shop apparatus 400 confirms the validity of the certificate $Cert_U$ of the user apparatus 200 by ascertaining that the equations $Cert_U{}^{e_{CA}} \bmod n_{CA} = h(ID_{CA} \| p_U)$ and $c^{e_B} \bmod n_B = h(g^z p_U{}^d \bmod p \| p_U)$ are satisfied. If the certificate is valid, the shop apparatus 400 computes a challenge value $d_1$ according to the equation $d_1 = h(r_1' \| A_1 \| A_S \| time)$ in step S704 and then transmits the shop's account number $A_S$ and the time data at which the transaction is made, to the user apparatus in step S705.

Then, the user apparatus in step S706, computes the challenge value $d_1$ according to $d_1 = h(r_1' \| A_S \| time)$ and then computes a response value $z_1$ in accordance with $z_1 = (r' + s_U d_1) \bmod q$ based on the secret information r' included in the electronic cash, the user's secret key $s_U$ and the challenge value $d_1$, so as to transmit the response value $z_1$ to the shop apparatus 400 in step S707. In step S708, the shop apparatus 400 computes a medium value $w_1$ based on the user's public key $p_U$ and the challenge value $d_1$ according to the equation $w_1 = g^{z_1} p_U{}^{d_1} \bmod p$, so as to confirm the validity of the electronic cash c by ascertaining that the equation $c^{e_B} \bmod n_B = h(w_1 \| p_U)$ is satisfied.

In addition, in step S701 the user apparatus 200 selects $r_1$ and $r_2$ randomly from the set $\{1, \ldots, q\}$ and then computes the images $r_1'$ and $r_2'$ according to the equation $r_1' = g^{r_1} \bmod p$, $r_2' = g^{r_2} \bmod p$, respectively. The user apparatus 200 also computes d and z in accordance with $d = h(c \| r' \| A \| r_1' \| A_1 \| r_2')$, $z = (r + s_U d) \bmod q$, wherein this computation can be made based on the Schnorr scheme. More specifically, the challenge value d computed by both the shop apparatus 400 and the user apparatus 200 can be considered as a signature for the message $\{c, r, A, r_1, A_1, r_2\}$ generated based on the Schnorr scheme. The user apparatus 200 transmits the information $\{c, r, A, r_1, A_1, r_2, d, z, p_U, Cert_U\}$ as an electrical electronic cash having the value $A_1$, to the shop apparatus 400, wherein $r'=g^r \bmod p$.

In summary, the payer(that is, the user apparatus 200) and the payee(that is, the shop apparatus 400) should store $\{c, r', A, r_1', A_1, r_2', d_1, z_1, w_1\}$ as the record of the transaction result. The payer needs these transaction data for the future transaction in which the payer can use the rest value $A-A_1$ of the electronic cash $c_2$, while the payee needs these transaction data for depositing the received value of the electronic cash to the bank apparatus 100 later.

On the other hand, one user apparatus 200 can transfer the electronic cash withdrawn from his account to another user apparatus 300, so that the latter user apparatus 300 can use the transferred electronic cash for paying goods or services to the shop apparatus. This can be accomplished by performing two protocols, i.e., a transfer protocol and a payment protocol. By the transfer protocol the first user apparatus 200 transfers the electronic cash to the second user apparatus 300 and by the payment protocol the second user apparatus 300 uses the transferred electronic cash from the first user apparatus 200 to the shop apparatus. At this time, the possible transfer number is almost determined by the vacant electronic cash issued by the bank apparatus and the size of the electronic cash is increased as the transactions are made.

Figure 8:
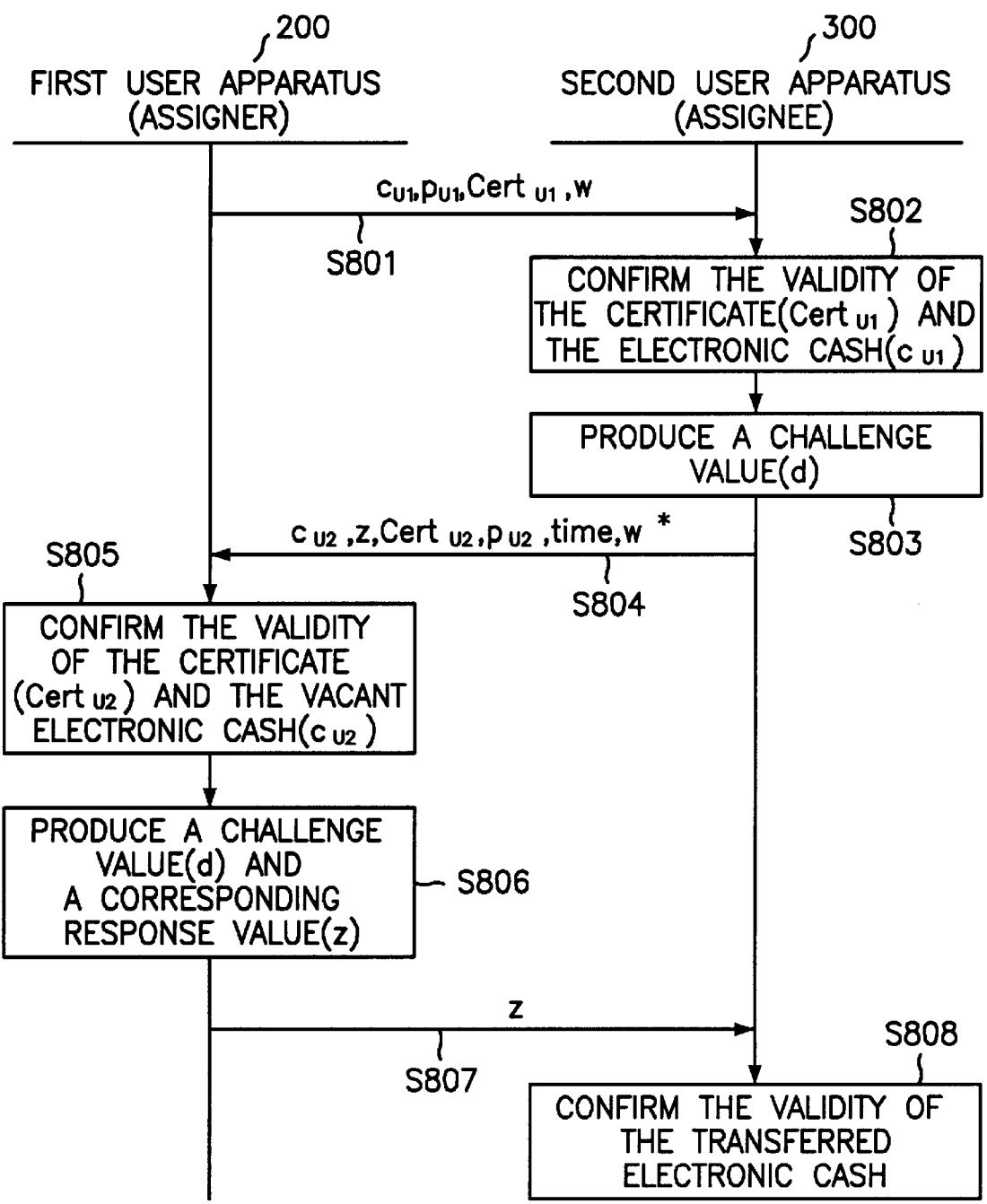
FIG. 8 is a flowchart for illustrating the electronic cash assignment protocol(or transfer protocol) of the electronic commercial transaction method according to the present invention.

FIG. 8 is a flowchart for illustrating the electronic cash transfer protocol in the electronic commercial transaction method according to one preferred embodiment of the present invention. Here, the first user apparatus 200 is representative of assigner and the second user apparatus 300 is representative of assignee in the electronic cash transfer protocol. Before performing the electronic cash transfer protocol, the first user apparatus 200 and the second user apparatus 300 have their own blind certificates $Cert_{U1}$ and $Cert_{U2}$. Also, the first user apparatus 200 withdraws a electronic cash $C_{U1}$, wherein $cu_{U1}{}^{e_B} \bmod n_B = h(g'\|p_{U1})$, from the bank apparatus 100, in order to transfer a A value of electronic cash to the second user apparatus 300, and the second user apparatus 300 performs the withdrawal protocol shown in FIG. 4 to acquire a vacant electronic cash $c_{U2,z}$ from the bank apparatus 100. Here, the equation of $c_{U2}{}^{e_{B,z}} \bmod n_{B,z} = h(w^*\|p_{U2})$ is right, $r^*$ is a random number, and $d_{B,z}$ and $n_{B,z}$ are the secret key and the public modulus of the bank apparatus 100, respectively. $w^*=r^* \bmod p$, $e_{B,z} \cdot d_{B,z} = 1 \bmod \phi(n_{B,z})$)

Under the above described condition, the transfer protocol of the present invention will be considered with reference to FIG. 8. First, the first user apparatus 200 transfers the electronic cash $c_{U1}$, his public key $p_{U1}$, his certificate $Cert_{U1}$ and a medium value w to the second user apparatus 300 in step S801, wherein $W=g^r \bmod p$. Then the second user apparatus 300 confirms the validity of the certificate $Cert_{U1}$ and the electronic cash $c_{U1}$ of the first user apparatus 200 by ascertaining $Cert_{U1}{}^{e_{CA}} \bmod n_{CA} = h(ID_{CA}\|p_{U1})$ and $c_{U1}{}^{e_B} \bmod n_B = h(w\|p_{U1})$ in step S802. Subsequently, the second user apparatus 300 computes a challenge value d in accordance with $d=h(c_{U1}\|time\|C_{U2,z})$ in step S803 and then in step S804 transmits the transaction related information such as his vacant electronic cash $c_{U2,z}$ having zero value, his public key $p_{U2}$, his certificate $Cert_{U2}$, the time at which the transaction is made, and the image $w^*$ of the medium value w, to the first user apparatus 200, wherein $w^*=g^r \bmod p$. Here, $r^*$ is a random number generated by the second user apparatus 300.

After that, the first user apparatus 200 confirms the validity of the certificate $Cert_U$ and the vacant electronic cash $c_{U2,z}$ in step S805 by ascertaining that $Cert_{U2}{}^{e_{CA}} \bmod n_{CA} = h(ID_{CA}\|p_{U2})$ and $c_{U2,z}{}^{e_{B,z}} \bmod n_{B,z} = h(w^*\|p_{U2})$ are right, and then in step S806 computes the challenge value d similarly to doing of the second user apparatus 300, and a response value z in accordance with the equations of $d=h(c_{U1}\|time\|c_{U2,z})$ and $z=(r+S_u d) \bmod q$, so as to transmit the response value z to the second user apparatus 300 in step S807.

The second user apparatus 300 computes a value w' in accordance with $w'=g^z p_{U1}{}^d \bmod p$ and then confirms the validity of the transferred electronic cash in step S808 by verifying that the equation of $c_{U1}{}^{e_B} \bmod n_B = h(w'\|P_{U1})$ is satisfied.

Figure 9:
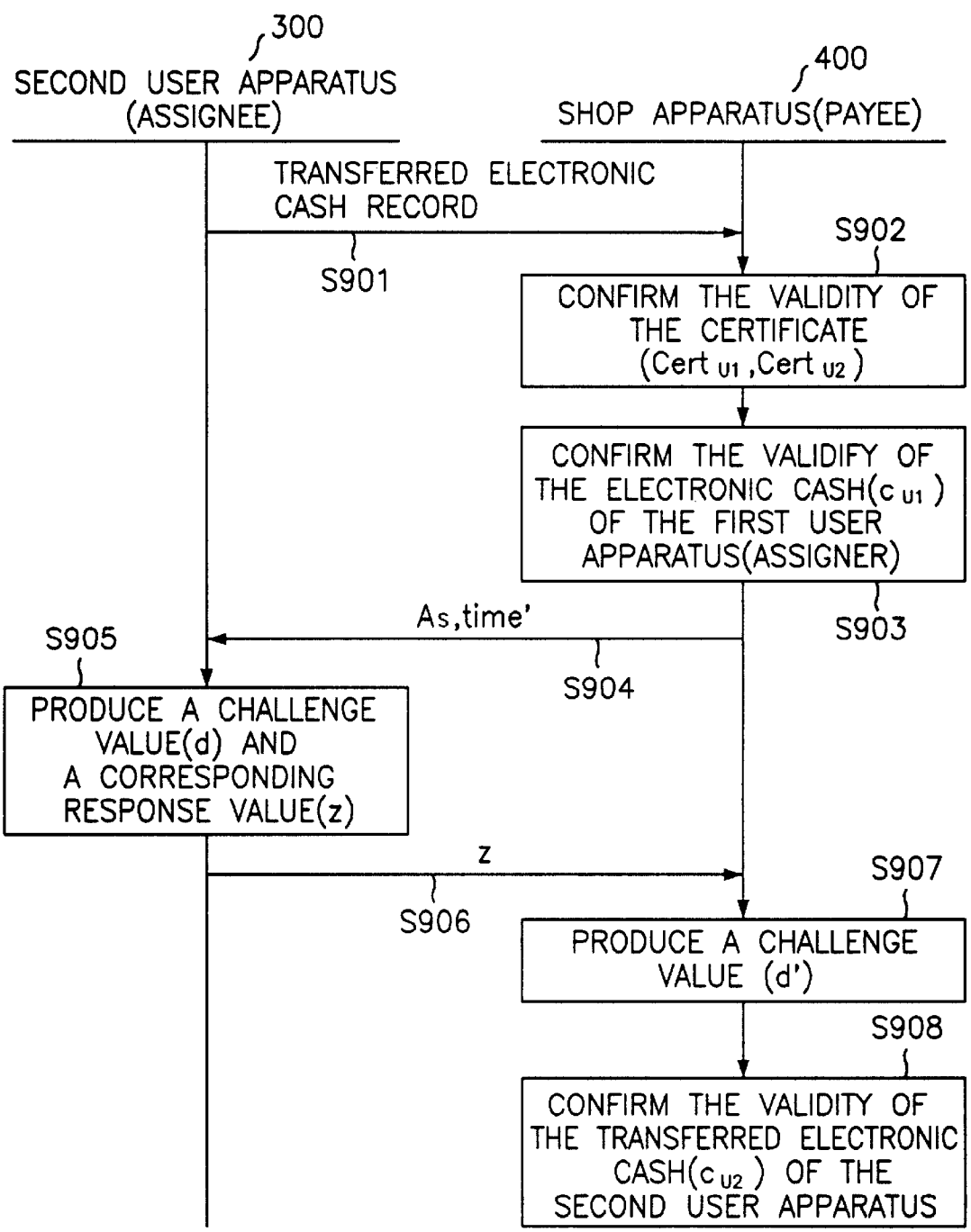
FIG. 9 is a flowchart for illustrating the assigned electronic cash payment protocol of the electronic commercial transaction method according to the present invention.

FIG. 9 is a flowchart of the transferred electronic cash payment protocol in the electronic commercial transaction method according to one preferred embodiment of the present invention. Here, the second user apparatus 300 is representative of payer and the shop apparatus 400 is representative of payee. Through the protocol shown in FIG. 9, the second user apparatus 300 can use the electronic cash $c_{U2,z}$ of A value transferred from the first user apparatus 200, to the shop apparatus 400 for payment. Here, $H_{1,2}$ represents the transferred record related to the electronic cash of A value, which has been transferred from the first user apparatus 200 to the second user apparatus 300.

Referring to FIG. 9, the transferred electronic cash payment protocol is initiated by step S901, in which the second user apparatus 300 transmits the transferred record $H_{1,2} = \{c_{U2,z}, z, d, c_{U1}, time, w, w^*, p_{U1}, Cert_{U1}, p_{U2}, Cert_{U2}\}$ related to the electronic cash transferred from the first user apparatus 200, to the shop apparatus 400. Then the shop apparatus 400 confirms the validity of the certificates $Cert_{U1}$ and $Cert_{U2}$ of the first and second user apparatuses 200 and 300 by verifying that the equations of $Cert_{U1}{}^{e_{CA}} \bmod n_{CA} = h(ID_{CA}\|P_{U1})$ and $Cert_{U2}{}^{e_{CA}} \bmod n_{CA} = h(ID_{CA}\|P_{U2})$ in step S902 and then confirms the validity of the electronic cash $c_{U1}$ transferred from the first user apparatus 200 in step S903. If certificates and the electronic cash are valid, the shop apparatus transmits his account number $A_S$ and the transaction time (time') for this payment transaction to the second user apparatus 300 in step S904.

The second user apparatus 300 computes a challenge value d' and a response value z in accordance with $d'=h(A_s\|time'\|c_{U2,z})$ and $z=(r^*+S_{U2}d') \bmod q$ in step S905 and then transmits the response value z to the shop apparatus 400 in step S906. The shop apparatus 400 computes the challenge value d', similarly to doing of the second user apparatus 300, and a response value w'' in accordance with $d'=h(A_s\|time'\|c_{U2,z})$ and $w''=g^z p_{U2}{}^{d'} \bmod p$ in step S907, and confirms the validity of the transferred electronic cash $c_{U2,z}$ by verifying that the equation $c_{U2,z}{}^{e_{B,z}} \bmod n_{B,z} = h(w''\|p_{U2})$ is satisfied, in step S908.

At this time, in step S904, in order for the second user apparatus 300 to confirm the validity of the electronic cash $c_{U1}$ transferred from the first user apparatus 200 and the validity of the electronic cash $c_{U2,z}$ for the transferred record $H_{1,2}$, the second user apparatus 300 first checks whether the electronic cash $c_{U1}$ include the electronic signature of the bank apparatus 100 using the equation of $c_{U1}{}^{e_B} \bmod n_B = h(w\|p_{U1})$ and checks whether the electronic cash $c_{U2,z}$ is legally transferred from the electronic cash $c_{U1}$ using the equations of $d=h(c_{U1}\|time\|c_{U2,z})$, $w'=g^z p_{U1}{}^d \bmod p$, and $c_{U1}{}^{e_B} \bmod n_B = h(w'\|p_{U1})$.

At this time, the user apparatus intending to be transferred a electronic cash from other user apparatus as described above, should acquire a vacant electronic cash from the bank apparatus. Without any vacant electronic cash, one user apparatus can not receive a electronic cash from another user apparatus.

As described above, the electronic transaction system and the electronic commercial transaction method using it are efficient in that the withdrawal, payment, deposit protocol of the electronic cash are very simple and the user apparatus' computation load required in the withdrawal protocol is very low, even most of them can be pre-computed. In addition, the electronic cash of the present invention satisfies all the condition of unforgeability, anonymity, detectability of double spending, non-repudiation and so forth, which are necessary to the electronic commercial transaction, so that users on the Internet can adopt this system with safe. Accordingly, the present invention can be used in wide range from a small note electronic transaction system requiring high efficiency to a large note electronic transaction system requiring high security.

The present invention also has the following effect.

First, the bank apparatus can trace a double spender of an electronic cash after the fact. In other words, if a user apparatus spends an electronic cash in twice for the different challenge value d and d', the bank apparatus computes z and z' based on these challenge value d and d' in accordance with the equations z=(r+$s_U$d) mod q and z'=(r+$s_U$d') mod q and also finds out the double-spender's secret key $s_U$ by computing in accordance with the equation of $s_U$=(z−z')/(d−d') mod q, so as to provide the double-spender's secret key to the authentication center apparatus as the proof of the double spender, thereby tracing the double-spender after the fact.

Secondly, the anonymity and the privacy of the user apparatus legally spending the electronic cash can be guaranteed.

The electronic cash of the present invention is signed by the bank apparatus, so that the bank apparatus can not connect a specific electronic cash to a specific user apparatus. It is because that the bank apparatus does not find out the identity of user apparatus from the user apparatus' public key.

Thirdly, the bank apparatus can conditionally trace the user with the help of the authentication center apparatus.

As mentioned before, an unconditional protection of the privacy of user apparatus may cause the criminal problem such as money laundry, blackmailing and the like. However, in the present invention, since the authentication center apparatus have the anonymous public key and corresponding personal information of user apparatus, doubtful or illegal user can be traced with the help of the authentication center apparatus under the allowance of a credible third authority, for example a court.

Fourth, the electronic cash issued from the bank apparatus can not be forged.

In order to forge the electronic cash of the present invention, the pair of (x, h(x)$^{d_B}$ mod $n_B$) must be forged. That is, the RSA signature scheme must be broken. However, this is substantially impossible unless the factorization of $n_B$ is known. Since the factorization of $n_B$ is known only to the bank apparatus, other apparatus but the bank apparatus can not create the electronic cash.

Fifth, it is impossible that the bank apparatus can make a false charge against a legal spender.

For the purpose of accusing a specific user as a double spender, the bank apparatus should present a secret key of the user as the proof of double spending. However, as long as the user apparatus follows the legal procedure and does not try double-spending under the discrete logarithm scheme, the bank apparatus can not find out the secret key of the user apparatus. In other words, the user apparatus is computationally protected from false-accusation.

What is claimed is:

1. An electronic cash transaction method comprising:

a certificate issuing step wherein an authentication center apparatus different from a bank apparatus issues a certificate to an user apparatus;

an account opening step wherein the user apparatus acquires an account from the bank apparatus using the certificate, with identity of the user apparatus;

an electronic cash withdrawal step wherein the user apparatus withdraws an electronic cash endowed with a signature of the bank apparatus, from the account; and an electronic cash payment step wherein the user apparatus uses the certificate and the electronic cash for payment of a specific commercial transaction in an off-line state with bank apparatus, wherein said certificate issuing step comprises:

a substep wherein the user apparatus generates a secret key and a public key, based on a discrete logarithm signature scheme;

a substep wherein the user apparatus transmits the public key, establishing an identity to the authentication center apparatus;

a substep wherein the authentication center generates the certificate for the public key of the user apparatus, using a secret key of the authentication center key, the public key of the user apparatus and identity-related information of the authentication center apparatus;

a substep wherein the authentication center apparatus transmits the certificate to the user apparatus; and a substep wherein the user apparatus confirms the validity of the certificate using the public key of the authentication center apparatus, the identity-related information of the authentication center apparatus and the public key of the user apparatus, wherein said substep for generating the certificate is performed based on the following equation, $$\text{Cert}_U = h(ID_{CA} \| p_U)^{d_{CA}} \mod n_{CA}$$

wherein $\text{Cert}_U$ represents the certificate, $ID_{CA}$ represents the identity-related information of the authentication center apparatus, $p_U$ represents the public key of the user apparatus, $d_{CA}$ represents the secret key of the authentication center apparatus, $n_{CA}$ represents a public modulus of the authentication center apparatus, and h( ) represents a one-way function.

2. The electronic cash transaction method in accordance with claim 1, wherein said substep for generating the public key of the user apparatus is performed based on the following equation:

$$p_U = g^{s_U} \mod p,$$

wherein $p_U$ represents the public key of the user apparatus, $s_U$ represents the secret key of the user apparatus, and g is a generator for the subgroup G(q) of $Z^*_p$, $Z^*_p$ being a mathematical notation which indicates a set of $\{1, 2, 3, \ldots, p-1\}$ and p indicates a prime number.

3. The electronic cash transaction method in accordance with claim 1, wherein said substep for confirming the validity of the certificate is made by verifying the following equation, $$[\text{Cert}_U]^{e_{CA}} \mod n_{CA} = h(ID_{CA} \| p_U)$$

wherein $\text{Cert}_U$ represents the certificate, $ID_{CA}$ represents the identity-related information of the authentication center apparatus, $p_U$ represents the public key of the user apparatus, $e_{CA}$ represents the public key of the authentication center apparatus, $n_{CA}$ represents a public modulus of the authentication center apparatus, and $h()$ represents a one-way function.

4. The electronic cash transaction method in accordance with claim 1, wherein said account opening step comprises:
- a substep wherein the user apparatus transmits the public key of the user apparatus and the corresponding certificate to the bank apparatus;
- a substep wherein the bank apparatus confirms the validity of the public key of the user apparatus and the corresponding certificate; and
- a substep wherein, if the public key of the user apparatus and the corresponding certificate are valid, the bank apparatus opens the account for the public key of the user apparatus.

5. An electronic cash transaction method comprising:
- a certificate issuing step wherein an authentication center apparatus different from a bank apparatus issues a certificate to an user apparatus;
- an account opening step wherein the user apparatus acquires an account from the bank apparatus using the certificate, with identity of the user apparatus;
- an electronic cash withdrawal step wherein the user apparatus withdraws an electronic cash endowed with a signature of the bank apparatus, from the account; and
- an electronic cash payment step wherein the user apparatus uses the certificate and the electronic cash for payment of a specific commercial transaction in an off-line state with bank apparatus, wherein said certificate issuing step comprises:
- a substep wherein the user apparatus generates a secret key and a public key, based on a discrete logarithm signature scheme;
- a substep wherein the user apparatus transmits the public key, establishing an identity to the authentication center apparatus;
- a substep wherein the authentication center generates the certificate for the public key of the user apparatus, using a secret key of the authentication center key, the public key of the user apparatus and identity-related information of the authentication center apparatus;
- a substep wherein the authentication center apparatus transmits the certificate to the user apparatus; and
- a substep wherein the user apparatus confirms the validity of the certificate using the public key of the authentication center apparatus, the identity-related information of the authentication center apparatus and the public key of the user apparatus, wherein said substep for confirming the validity of the public key of the user apparatus and the corresponding certificate is preformed by verifying the following equation, $$[\text{Cert}_U]^{e_{CA}} \mod n_{CA} = h(ID_{CA} \| p_U)$$

wherein $\text{Cert}_U$ represents the certificate, $ID_{CA}$ represents the identity-related information of the authentication center apparatus, $p_U$ represents the public key of the user apparatus, $e_{CA}$ represents the public key of the authentication center apparatus, $n_{CA}$ represents a public modulus of the authentication center apparatus, and $h()$ represents a one-way function.

6. The electronic cash transaction method in accordance with claim 5, wherein said electronic cash withdrawal step comprises:
- a substep wherein the user apparatus generates a random number of electronic cash and produces an image for the electronic cash random number;
- a substep wherein the user apparatus generates a message (electronic cash candidate) for electronic cash withdrawal;
- a substep wherein the user apparatus generates a signature of the user apparatus on the message;
- a substep wherein the user apparatus transmits the message, the signature of the user apparatus, the public key of the user apparatus and the corresponding certificate;
- a substep wherein the bank apparatus confirms the validity of the public key of the user apparatus and the corresponding certificate;
- a substep wherein, if the public key of the user apparatus and the corresponding certificate are valid, the bank apparatus generates a signature of the bank apparatus on the message;
- a substep wherein the bank apparatus transmits the message with signature of the bank apparatus to the user apparatus;
- a substep wherein the user apparatus verifies a bank apparatus signed message from the bank apparatus; and
- a substep wherein the user apparatus stores the bank apparatus signed message and the random number as an electronic cash.

7. The electronic cash transaction method in accordance with claim 6, wherein the bank apparatus debits the value of the withdrawn electronic cash for the account of the user apparatus.

8. An electronic cash transaction method comprising:
- a certificate issuing step wherein an authentication center apparatus different from a bank apparatus issues a certificate to an user apparatus;
- an account opening step wherein the user apparatus acquires an account from the bank apparatus using the certificate, with identity of the user apparatus;
- an electronic cash withdrawal step wherein the user apparatus withdraws an electronic cash endowed with a signature of the bank apparatus, from the account; and
- an electronic cash payment step wherein the user apparatus uses the certificate and the electronic cash for payment of a specific commercial transaction in an off-line state with bank apparatus, wherein said electronic cash withdrawal step comprises:
- a substep wherein the user apparatus generates a random number of electronic cash and produces an image for the electronic cash random number;
- a substep wherein the user apparatus generates a message (electronic cash candidate) for electronic cash withdrawal;
- a substep wherein the user apparatus generates a signature of the user apparatus on the message;
- a substep wherein the user apparatus transmits the message, the signature of the user apparatus, the public key of the user apparatus and the corresponding certificate;
- a substep wherein the bank apparatus confirms the validity of the public key of the user apparatus and the corresponding certificate;
- a substep wherein, if the public key of the user apparatus and the corresponding certificate are valid, the bank apparatus generates a signature of the bank apparatus on the message;

a substep wherein the bank apparatus transmits the message with signature of the bank apparatus to the user apparatus;

a substep wherein the user apparatus verifies a bank apparatus signed message from the bank apparatus; and a substep wherein the user apparatus stores the bank apparatus signed message and the random number as an electronic cash, wherein said substep for confirming the validity of the public key of the user apparatus and the corresponding certificate is preformed by verifying the following equation, $$[Cert_U]^{e_{CA}} \bmod n_{CA} = h(ID_{CA}\|p_U)$$

wherein $Cert_U$ represents the certificate, $ID_{CA}$ represents the identity-related information of the authentication center apparatus, $p_U$ represents the public key of the user apparatus, $e_{CA}$ represents the public key of the authentication center apparatus, $n_{CA}$ represents a public modulus of the authentication center apparatus and $h(\ )$ represents a one-way function.

9. The electronic cash transaction method in accordance with claim 8, wherein said random number r is one randomly selected from $\{1, \ldots, q\}$ and the image r' of the random number is generated according to the following equation:

$$r' = g^r \bmod p,$$

wherein g represents a generator for the subgroup G(q) of $Z^*_p$ and q is an order of G(q), p being a prime number, r being randomly selected from a set $\{1, \ldots, q\}$, q being dividable by p−1 and the $Z^*_p$ being a mathematical notation which indicates a set of $\{1, 2, 3, \ldots, p-1\}$.

10. The electronic cash transaction method in accordance with claim 8, wherein said substep for generating a message for electronic cash withdrawal is performed in accordance with following equation, $$h(r'\|p_U)$$

wherein $p_U$ represents the public key of the user apparatus, r' represents the image of the random number, and $h(\ )$ represents a one-way function.

11. The electronic cash transaction method in accordance with claim 8, wherein the substep for generating a signature of the bank apparatus on the message c' is performed by generating a bank apparatus signed message c in accordance with following equation, $$c = [c']^{d_n} \bmod n_B;$$

wherein $d_B$ represents the secret of the bank apparatus and $n_B$ represents a public modulus of the bank apparatus.

12. The electronic cash transaction method in accordance with claim 8, when the user apparatus is served as a payer and an opposite party of a commercial transaction is served as a payee, wherein said electronic cash payment step comprises:

a substep wherein the payer transmits an electronic cash message, a public key and corresponding certificate, to the payee;

a substep wherein the payee confirms the validity of the payer's public key and the corresponding certificate;

a substep wherein the payee transmits a payee's account number at the bank apparatus and a transaction time, to the payer;

a substep wherein the payee produces a challenge value based on the electronic cash message, the payee's account number at the bank apparatus and the transaction time;

a substep wherein the payer produces the challenge value based on the electronic cash message, the payee's account number at the bank apparatus and the transaction time;

a substep wherein the payer computes a response value for the challenge value using a random number related to the electronic cash, the challenge value and a secret key of the payer;

a substep wherein the payer transmits the response value to the payee;

a substep wherein the payee confirms the validity of the response value; and a substep wherein, if the response value is valid, the payee accepts the electronic cash.

13. An electronic cash transaction method comprising:

a certificate issuing step wherein an authentication center apparatus different from a bank apparatus issues a certificate to an user apparatus;

an account opening step wherein the user apparatus acquires an account from the bank apparatus using the certificate, with identity of the user apparatus;

an electronic cash withdrawal step wherein the user apparatus withdraws an electronic cash endowed with a signature of the bank apparatus, from the account; and an electronic cash payment step wherein the user apparatus uses the certificate and the electronic cash for payment of a specific commercial transaction in an off-line state with bank apparatus, wherein, when the user apparatus is served as a payer and an opposite party of a commercial transaction is served as a payee, said electronic cash payment step comprises:

a substep wherein the payer transmits an electronic cash message, a public key and corresponding certificate, to the payee;

a substep wherein the payee confirms the validity of the payer's public key and the corresponding certificate;

a substep wherein the payee transmits a payee's account number at the bank apparatus and a transaction time, to the payer;

a substep wherein the payee produces a challenge value based on the electronic cash message, the payee's account number at the bank apparatus and the transaction time;

a substep wherein the payer produces the challenge value based on the electronic cash message, the payee's account number at the bank apparatus and the transaction time;

a substep wherein the payer computes a response value for the challenge value using a random number related to the electronic cash, the challenge value and a secret key of the payer;

a substep wherein the payer transmits the response value to the payee;

a substep wherein the payee confirms the validity of the response value; and a substep wherein, if the response value is valid, the payee accepts the electronic cash, wherein said substep for the payee's confirming the validity of the payer's public key and the corresponding certificate, is performed by verifying the following equation, $$[Cert_U]^{e_{CA}} \bmod n_{CA} = h(ID_{CA}\|p_U)$$

where in $p_U$ represents the certificate of the payer, $ID_{CA}$ represents the identity-related information of the authentication center apparatus, pu represents the public key of the payer, $e_{CA}$ represents the public key of the authentication center apparatus, $n_{CA}$ represents a public modulus of the authentication center apparatus and h( ) represents a one-way function.

14. The electronic cash transaction method in accordance with claim 13, wherein said substep for the payee's producing the challenge value d based on the electronic cash message c, the payee's account number $A_S$ and the transaction time is performed in accordance with following equation, $$d=h(A_S\|\text{time}\|c)$$

wherein h( ) represents a one-way function.

15. The electronic cash transaction method in accordance with claim 13, wherein said substep for the payer's computing the response value z for the challenge value d using a random number r related to the electronic cash, the challenge value d and a secret key of the payer $s_U$ is performed in accordance with following equation:

$$Z=(r+s_U d)\bmod q,$$

wherein q is dividable by p−1 and p is a prime number.

16. The electronic cash transaction method in accordance with claim 13, wherein said substep for the payee's confirming the validity of the response value is preformed by verifying the following equation:

$$c^{e_B} \bmod n_B = h(g^z p_U^d \bmod p\|p_U)$$

wherein $e_B$ represents the public key of the bank apparatus, $n_B$ represents a public modulus of the bank apparatus, $p_U$ represents the public key of the payer, d represents the challenge value, z represents the response value, g represents a generator for the subgroup G(q) of $Z^*_p$ and h( ) represents a one-way function, wherein $Z^*_p$ is a mathematical notation which indicates a set of $\{1, 2, 3, \ldots, p-1\}$ and p indicates a prime number.

17. The electronic cash transaction method in accordance with claim 13, wherein said payee is a shop apparatus.

18. The electronic cash transaction method in accordance with claim 13, further comprising an electronic cash settlement step wherein a payee received the electronic cash provides a record related to the electronic cash transaction to the bank apparatus as to credit the value of the electronic cash to an account of the payee.

19. The electronic cash transaction method in accordance with claim 13, wherein, when the user apparatus is called as a payer, said electronic cash settlement step comprises:

a substep wherein the payee transmits an electronic cash message, a public key of the payer and a corresponding certificate, a challenge value, a transaction time, a payee's account number and a response value, to the bank apparatus;

a substep wherein the bank apparatus confirms the validity of the payer's public key and the corresponding certificate and the validity of the response value; and a substep wherein the bank apparatus checks whether the electronic cash is stored in a deposit database of the bank apparatus.

20. An electronic cash transaction method comprising:

a certificate issuing step wherein an authentication center apparatus different from a bank apparatus issues a certificate to an user apparatus;

an account opening step wherein the user apparatus acquires an account from the bank apparatus using the certificate, with identity of the user apparatus;

an electronic cash withdrawal step wherein the user apparatus withdraws an electronic cash endowed with a signature of the bank apparatus, from the account; and an electronic cash payment step wherein the user apparatus uses the certificate and the electronic cash for payment of a specific commercial transaction in an off-line state with bank apparatus, wherein said substep for the bank apparatus's confirming the validity of the payer's public key and the corresponding certificate is performed by verifying the following equation, $$[Cert_U]\bmod n_{CA}=h(ID_{CA}\|p_U)$$

where in $Cert_U$ represents the certificate of the payer, $ID_{CA}$ represents the identity-related information of the authentication center apparatus, $p_U$ represents the public key of the payer, $e_{CA}$ represents the public key of the authentication center apparatus, ncA represents a public modulus of the authentication center apparatus and h( ) represents a one-way function.

21. The electronic cash transaction method in accordance with claim 20, wherein said substep for the bank apparatus's confirming the validity of the response value is performed by verifying the following equation:

$$c^{e_B} \bmod n_B = h(g^z p_U^d \bmod p\|p_U)$$

wherein $e_B$ represents the public key of the bank apparatus, $n_B$ represents a public modulus of the bank apparatus, $p_U$ represents the public key of the payer, d represents the challenge value, z represents the response value, g represents a generator for the subgroup G(q) of $Z^*_p$ and h( ) represents a one-way function, $Z^*_p$ being a mathematical notation which indicates a set of $\{1, 2, 3, \ldots, p-1\}$ and p indicates a prime number.

22. The electronic cash transaction method in accordance with claim 20, wherein said electronic cash payment step is accomplished such that the electronic cash possessed by the user apparatus as the payer is divided and then some of the electronic case is used for payment.

23. An electronic cash transaction method comprising:

a certificate issuing step wherein an authentication center apparatus different from a bank apparatus issues a certificate to an user apparatus;

an account opening step wherein the user apparatus acquires an account from the bank apparatus using the certificate, with identity of the user apparatus;

an electronic cash withdrawal step wherein the user apparatus withdraws an electronic cash endowed with a signature of the bank apparatus, from the account; and an electronic cash payment step wherein the user apparatus uses the certificate and the electronic cash for payment of a specific commercial transaction in an off-line state with bank apparatus, wherein said electronic cash payment step is accomplished such that the electronic cash possessed by the user apparatus as the payer is divided and then some of the electronic case is used for payment, and wherein said electronic cash payment step comprises:

a substep wherein the payer selects a payment electronic cash random number $r_1$ and a remnant electronic cash random number $r_2$;

a substep wherein the payer generates images $r_1'$, $r_2'$ for the payment electronic cash random number and the remnant electronic cash random number;

a substep wherein the payer produces an electronic cash message signature d based on the electronic cash message c, the electronic cash random number image r', the value A of the electronic cash, the payment electronic cash random number image $r_1'$, the value of the payment electronic cash $A_1$ and the remnant electronic cash random number image $r_2$ and generates an electronic cash message signature response value z based on the electronic cash message signature d, the secret key of the payer $s_U$ and the electronic cash random number r;

a substep wherein the payer transmits the electronic cash message c, the electronic cash random number image r', the value A of the electronic cash the payment electronic cash random number image $r_1'$, the value $A_1$ of the payment electronic cash, the remnant electronic cash random number image $r_2'$ the electronic cash message signature d, the public key of the payer $p_U$ and the corresponding certificate $Cert_U$ to the payee;

a substep wherein the payee confirms the validity of the payer's public key and the corresponding certificate;

a substep wherein the payee transmits a payee's account number and the transaction time;

a substep wherein the payee produces a challenge value $d_1$ based on the payment electronic cash random number image $r_1'$, the value $A_1$ of the payment electronic cash, the account number $A_S$ of the payee and the transaction time;

a substep wherein the payer computes a response value $z_1$ based on the payment electronic cash random number image $r_1'$, the value $A_1$ of the payment electronic cash, the account number $A_S$ of the payee and the transaction time, the secret key $s_U$ of the payer and the electronic cash random number r;

a substep wherein the payer transmits the response value to the payee;

a substep wherein the payee confirms the validity of the response value $z_1$; and a substep wherein, if the response value is valid, the payee accepts the electronic cash.

24. The electronic cash transaction method in accordance with claim 23, wherein said substep for the payer's generating images $r_1'$, $r_2'$ for the payment electronic cash random number and the remnant electronic cash random number is performed in accordance with following equation $$r_1' = g^{r_1} \bmod p$$

$$r_2' = g^{r_2} \bmod p,$$

wherein g represents a generator for the subgroup G(g) of $Z^*_p$ and q is an order of G(q), p being a prime number, r being randomly selected from a set of {1, ..., q), q being dividable by p−1 and $Z^*_p$ being a mathematical notation which indictes a set of {1, 2, 3, ..., p−1}.

25. The electronic cash transaction method in accordance with claim 23, wherein said substep for the payer's producing the electronic cash message signature d based on the electronic cash message c, the electronic cash random number image r', the value A of the electronic cash, the payment electronic cash random number image $r_1'$, the value of the payment electronic cash $A_1$ and the remnant electronic cash random number image $r_2'$, and for generating the electronic cash message signature response value z based on the electronic cash message signature d, the secret key of the payer $s_U$ and the electronic cash random number r, is performed in accordance with following equations, $$d = h(c\|r'\|A\|r_1'\|A_1\|r_2')$$

$$z = (r + s_U d) \bmod q$$

wherein h( ) represents a one-way function.

26. The electronic cash transaction method in accordance with claim 23, wherein said substep for the payee's confirming the validity of the payer's public key and the corresponding certificate, is performed by verifying the following equation, $$[Cert_U]^{e_{CA}} \bmod n_{CA} = h(ID_{CA}\|p_U)$$

wherein $Cert_U$ represents the certificate, $ID_{CA}$ represents the identity-related information of the authentication center apparatus, $p_U$ represents the public key of the payer, $e_{CA}$ represents a public key of the authentication center apparatus, $n_{CA}$ represents the public modulus of the authentication center apparatus and h( ) represents a one-way function.

27. The electronic cash transaction method in accordance with the claim 23, wherein said substep for the payee's producing the challenge value $d_1$ based on the payment electronic cash random number image $r_1'$, the value $A_1$ of the payment electronic cash, the account number $A_S$ of the payee and the transaction time, is performed in accordance with the following equation, $$d_1 = h(r_1'\|A_1\|A_S\|\text{time})$$

wherein h( ) represents a one-way function.

28. The electronic cash transaction method in accordance with claim 23, wherein said substep for the payer's computing the response value $z_1$ based on the payment electronic cash random number image $r_1'$, the value $A_1$ of the payment electronic cash, the account number $A_S$ of the payee and the transaction time, the secret key $s_U$ of the payer and the electronic cash random number r, comprises the substeps of:

generating the challenge value $d_1$ in accordance with $d_1 = h(r_1'\|A_1\|As\|\text{time})$, said h( ) representing a one-way function; and producing the response value $z_1$ in accordance with $z_1 = (r + s_U d_1) \bmod q$, wherein q is dividable by p−1 and p is a prime number.

29. The electronic cash transaction method in accordance with claim 23, wherein said substep for the payee's confirming the validity of the response value $z_1$ is preformed by verifying the following equation:

$$c^{e_B} \bmod n_B = h(g^{z_1} p_U^{d_1} \bmod p \| p_U$$

wherein $e_B$ represents the public key of the bank apparatus, $n_B$ represents a public modulus of the bank apparatus, $p_U$ represents the public key of the payer, $d_1$ represents the challenge value, $z_1$ represents the response value, g represents a generator for the subgroup G(q) of $Z^*_p$ and h( ) represents a one-way function, $Z^*_p$ being a mathematical notation which indictes a set of {1, 2, 3, ..., p−1} and p indicates a prime number.

30. The electronic cash transaction method in accordance with claim 23, further comprising a substep wherein the payer produces a medium value $w_1$ in accordance with $w_1 = g^{z_1} p_U^{d_1} \bmod p$, wherein g represents a generator for the subgroup G(q) of $Z^*_p$ and q is an order of G(q), p being a prime numbers, r being randomly selected from a set {1, ..., q}, q being dividable by p−1 and $Z^*_p$ being a mathematical notation which indicates a set of {1, 2, 3 ..., p−1}.

31. The electronic cash transaction method in accordance with claim 30, further comprising a substep wherein the payer stores the electronic cash message c, the electronic cash random number image r', the value A of the electronic cash, the payment electronic cash random number image $r_1'$, the value $A_1$ of the payment electronic cash, the remnant electronic cash random number image $r_2'$, the challenge value $d_1$ and the medium value $w_1$.

32. The electronic cash transaction method in accordance with claim 30, further comprising:
   a substep wherein the payer transmits the medium value $w_1$ to the payee; and
   a substep wherein the payee stores the electronic cash message c, the electronic cash random number image r', the value A of the electronic cash, the payment electronic cash random number image $r_1'$, the value $A_1$ of the payment electronic cash, the remnant electronic cash random number image $r_2'$, the challenge value $d_1$ and the medium value $w_1$.

33. The electronic cash transaction method in accordance with claim 23, wherein the payer stores the electronic cash message c, the electronic cash random number image r', the value A of the electronic cash, the payment electronic cash random number image $r_1'$, the value $A_1$ of the payment electronic cash, the remnant electronic cash random number image $r_2'$ and the challenge value $d_1$.

34. The electronic cash transaction method in accordance with claim 23, wherein the payee stores the electronic cash message c, the electronic cash random number image r', the value A of the electronic cash, the payment electronic cash random number image $r_1'$, the value $A_1$ of the payment electronic cash, the remnant electronic cash random number image $r_2'$ and the challenge value $d_1$.

35. An electronic cash transaction method comprising:
   a certificate issuing step wherein an authentication center apparatus different from a bank apparatus issues a certificate to an user apparatus;
   an account opening step wherein the user apparatus acquires an account from the bank apparatus using the certificate, with identity of the user apparatus;
   an electronic cash withdrawal step wherein the user apparatus withdraws an electronic cash endowed with a signature of the bank apparatus, from the account; and
   an electronic cash payment step wherein the user apparatus uses the certificate and the electronic cash for payment of a specific commercial transaction in an off-line state with bank apparatus,
   wherein there are two or more user apparatuses each performing said certificate issuing step and said account opening step and one of them is served as an assigner and another is served as an assignee, and said method further comprising an electronic cash transfer step wherein the assigner transfers an electronic cash to the assignee.

36. The electronic cash transaction method in accordance with claim 35, wherein said electronic cash transfer step comprises:
   a substep wherein the assignee withdraws a vacant electronic cash $c_{U2,z}$ from the bank apparatus;
   a substep wherein the assigner transmits the electronic cash message $c_{U1}$, an assigner's public key $p_{U1}$ and corresponding certificate $Cert_{U1}$, an electronic cash random number image w, to the assignee;
   a substep wherein the assignee confirms the validity of the assigner's public key $p_{U1}$ and the corresponding certificate $Cert_{U1}$;
   a substep wherein the assignee confirms the validity of the received electronic cash message $c_{U1}$;
   a substep wherein, if the assigner's public key and the corresponding certificate, and the received electronic cash are valid, the assignee produces a challenge value d;
   a substep wherein the assignee transmits the vacant electronic cash message $c_{U2,z}$, an assignee's public key PU2 and corresponding certificate $Cert_{U2}$, a transaction time, and a vacant electronic cash random number image w*, to the assigner;
   a substep wherein the assigner confirms the validity of the assignee's public key and the corresponding certificate;
   a substep wherein the assigner confirms the validity of the vacant electronic cash from the assignee;
   a substep wherein the assigner computes a challenge value d based on the electronic cash message $c_{U1}$, the transaction time, the vacant electronic cash message $c_{U2,z}$;
   a substep wherein the assigner produces a response value based on the challenge value d, an assigner's secret key $S_{U1}$ and the electronic cash random number r;
   a substep wherein the assigner transmits the response value to the assignee; and
   a substep wherein the assignee confirms the response value.

37. The electronic cash transaction method in accordance with claim 36, wherein said substep wherein the assignee withdraws the vacant electronic cash from the bank apparatus comprises:
   a substep for generating a random number for the vacant electronic cash;
   a substep for generating an image for the vacant electronic cash random number;
   a substep for producing a message for withdrawal of the vacant electronic cash;
   a substep for generating a signature of the assignee on the message;
   a substep wherein the assignee transmits the message, the assignee's signature, the assignee's public key and the corresponding certificate;
   a substep wherein the bank apparatus confirms the validity of the assignee's public key and the corresponding certificate;
   a substep wherein the bank apparatus confirms the validity of the assignee's signature;
   a substep wherein the bank apparatus makes a bank apparatus signature on the message, if the assignee's public key and the corresponding certificate, and the assignee's signature are all valid;
   a substep wherein the bank apparatus transmits the message given with the bank apparatus's signature, to the assignee;
   a substep wherein the assignee verifies a vacant electronic cash message having the bank apparatus's signature, from the bank apparatus; and
   a substep wherein the assignee stores the vacant electronic cash message having the bank apparatus's signature along with the vacant random number, as vacant electronic cash.

38. The electronic cash transaction method in accordance with claim 36, wherein said substep for the assignee's confirming the validity of the assigner's public key and the corresponding certificate, is performed by verifying the following equation, $$[\text{Cert}_{U1}]^{e_{CA}} \bmod n_{CA} = h(ID_{CA} \| p_{U1})$$

wherein $\text{Cert}_{U1}$ represents the assigner's certificate, $ID_{CA}$ represents the identity-related information of the authentication center apparatus, $p_{U1}$ represents the assigner's public key, $e_{CA}$ represents the public key of the authentication center apparatus, $n_{CA}$ represents public modulus of the authentication center apparatus and h( ) represents a one-way function.

39. The electronic cash transaction method in accordance with claim 36, wherein said substep for the assignee's confirming the validity of the received electronic cash message $c_{U1}$, is performed by verifying the following equation, $$c_{U1}^{e_B} \bmod n_B = h(w \| p_{U1})$$

wherein $e_B$ represents the public key of the bank apparatus, $n_B$ represents the public modulus of the bank apparatus, $p_{U1}$ represents the assigner's public key, w represents the electronic cash random number image and h( ) represents a one-way function.

40. The electronic cash transaction method in accordance with claim 36, wherein said substep for the assigner's producing the challenge value d, is performed in accordance with $$d = h(c_{U1} \| \text{time} \| c_{U2,z})$$

wherein h( ) represents a one-way function.

41. The electronic cash transaction method in accordance with claim 36, wherein said step for the assigner's confirming the validity of the assignee's public key and the corresponding certificate is performed by verifying the following equation, $$[\text{Cert}_{U2}]^{e_{CA}} \bmod n_{CA} = h(ID_{CA} \| p_{U2})$$

wherein $\text{Cert}_{U2}$ represents the assignee's certificate, $ID_{CA}$ represents the identity-related information of the authentication center apparatus, $p_{U2}$ represents the assignee's public key, $e_{CA}$ represents the public key of the authentication center apparatus, $n_{CA}$ represents a public modulus of the authentication center apparatus and h( ) represents a one-way function.

42. The electronic cash transaction method in accordance with claim 36, wherein said substep for the assigner's confirming the validity of the assignee's vacant electronic cash, is performed by verifying the following equation, $$c_{U2}^{e_{B,z}} \bmod n_{B,z} = h(w^* \| p_{U2})$$

wherein $e_{B,z}$ represents the public key of the bank apparatus, $n_{B,z}$ represents a public modulus of the bank apparatus, $p_{U2}$ represents the assignee's public key, $W^*$ is the vacant electronic cash random number image and h( ) represents a one-way function.

43. The electronic cash transaction method in accordance with claim 36, wherein said substep for the assigner's producing the challenge value based on the electronic cash message, the transaction time, the vacant electronic cash message, is performed in accordance with $$d = h(c_{U1} \| \text{time} \| c_{U2,z})$$

wherein h( ) represents a one-way function.

44. The electronic cash transaction method in accordance with claim 43, wherein said substep for the assigner's producing the response value for the challenge value using the challenge value, the assigner's secret key, the electronic cash random number is performed in accordance with equation:

$$Z = (r + s_{U1} d) \bmod q,$$

wherein r is the electronic cash random number and $s_{U1}$ is the assigner's secret key, q is dividable by p−1 and p is a prime number.

45. The electronic cash transaction method in accordance with claim 36, wherein said substep for the assignee's confirming the validity of the response value comprises the substeps of:

producing a medium value w' using the assigner's public key $p_{U1}$, the challenge value d, the response value z in accordance with $w' = g^z p_{U1}^d \bmod p$, wherein g represents a generator for the subgroup G(q) of $Z^*_p$ and h( ) represents a one-way function; and verifying that the equation $c_{U1}^{e_B} \bmod n_B = h(w \| p_{U1})$, using the medium value w', wherein $e_B$ represents the public key of the bank apparatus, $n_B$ represents a public modulus of the bank apparatus, $p_{U1}$ is the assigner's public key and h( ) represents a one-way function, $Z^*_p$ is a mathematical notation which indicates a set of {1, 2, 3, . . . , p−1}, p indicates a prime number, $g^z$ represents the multiplication of g as many as r times and z represents a response value.

46. The electronic cash transaction method in accordance with claim 35, further comprising a transferred electronic cash payment step wherein the assignee as payer uses the electronic cash to a payee for payment of a commercial transaction.

47. The electronic cash transaction method in accordance with claim 46, wherein said transferred electronic cash payment step comprises:

a substep wherein the payer transmits an electronic cash transfer record $H_{1,2}$ to the payee;

a substep wherein the payee confirms the validity of the assigner's public key and the corresponding certificate;

a substep wherein the payee confirms the validity of the payer's public key and the corresponding certificate;

a substep wherein the payee confirms the validity of the transferred electronic cash;

a substep wherein the payee transmits a payee's account number and a transaction time related to payment of a commercial transaction;

a substep wherein the payer produces a challenge value and corresponding response value using the payee's account number, the transaction time of said payment, and the vacant electronic cash message;

a substep wherein the payer transmits the response value to the payee; and a substep wherein the payee confirms the validity of the response value.

48. The electronic cash transaction method in accordance with claim 47, wherein said electronic cash transfer record $H_{1,2}$ includes a vacant electronic cash message $c_{U2,z}$, a response value z, a challenge value d, an electronic cash message $c_{U1}$, an electronic cash transfer time, an electronic cash random number image w, a vacant electronic cash random number image $w^*$, the assigner's public key $p_{U1}$ and corresponding certificate $\text{Cert}_{U1}$, the payer's public key $p_{U2}$ and corresponding certificate $\text{Cert}_{U2}$.

49. The electronic cash transaction method in accordance with claim 47, wherein said substep for the payee's confirming the validity of the assigner's public key and corresponding certificate, is performed by verifying the following equation, $$[\text{Cert}_{U1}]^{e_{CA}} \bmod n_{CA} = h(ID_{CA}\|p_{U1})$$

wherein $\text{Cert}_{U1}$ is the certificate for the assigner's public key, $ID_{CA}$ represents the identity-related information of the authentication center apparatus, $p_{U1}$ is the assigner's public key, $e_{CA}$ represents the public key of the authentication center apparatus, $n_{CA}$ represents a public modulus of the authentication center apparatus and $h(\ )$ represents a one-way function.

50. The electronic cash transaction method in accordance with claim 47, wherein said substep for the payee's confirming the validity of the payer's public key and corresponding certificate, is performed by verifying the following equation, $$[\text{Cert}_{U2}]^{e_{CA}} \bmod n_{CA} = h(ID_{CA}\|p_{U2})$$

wherein $\text{Cert}_{U2}$ is the certificate for the payer's public key, $ID_{CA}$ represents the identity-related information of authentication center apparatus, $p_{U2}$ represents the payer's public key, $e_{CA}$ represents the public key of the authentication center apparatus, $n_{CA}$ represents a public modulus of the authentication center apparatus and $h(\ )$ represents a one-way function.

51. The electronic cash transaction method in accordance with claim 47, wherein said substep for the payee's confirming the validity of the transferred electronic cash comprises the substeps of:
    confirming the validity of the electronic cash message;
    confirming the validity of the payer's vacant electronic cash message; and
    confirming that the electronic cash transfer is legally performed.

52. The electronic cash transaction method in accordance with claim 51, wherein said substep for confirming the validity of the electronic cash message is performed by verifying that the following equation is correct so as to ascertain that the electronic cash message includes the bank apparatus's signature, $$c_{U1}^{e_B} \bmod n_B = h(w\|p_{U1})$$

wherein $c_{U1}$ represents the electronic cash message, $e_B$ represents the public key of the bank apparatus, $n_B$ represents a public modulus of the bank apparatus, w represents the electronic cash random number image, $p_{U1}$ is the assigner's public key and $h(\ )$ represents a one-way function.

53. The electronic cash transaction method in accordance with claim 51, wherein said substep for confirming the validity of the payer's vacant electronic cash message, is performed by verifying that the following equation is correct, thereby ascertaining that the vacant electronic cash message includes the bank apparatus's signature, $$c_{U2,z}^{e_{B,z}} \bmod n_{B,z} = h(w^*\|p_{U2})$$

wherein $c_{U2,z}$ represents the vacant electronic cash message, $e_{B,z}$ represents a public key of the bank apparatus, $n_{B,z}$ represents a public modulus of the bank apparatus, $w^*$ represents the vacant electronic cash random number image, $p_{U2}$ represents the payer's public key and $h(\ )$ represents a one-way function.

54. The electronic cash transaction method in accordance with claim 51, wherein said substep for confirming that the electronic cash transfer is legally performed is preformed by verifying the following equation:

$$c_{U1}^{e_B} \bmod n_B = h(g^z p_{U1}^d \bmod p\|p_{U1})$$

wherein $c_{U1}$ represents the electronic cash message, $e_B$ represents the public key of the bank apparatus, $n_B$ represents a public modulus of the bank apparatus, $p_{U1}$ represents the assigner's public key, d represents the challenge value, g represents a generator for the subgroup $G(q)$ of $Z^*_p$ and $h(\ )$ represents a one-way function, $Z^*_p$ represents a mathematical notation which indicates a set of $\{1, 2, 3, \ldots, p-1\}$, p represents a prime number, $g^z$ represents the multiplication of g as many as r times, and z represents a response time.

55. The electronic cash transaction method in accordance with claim 54, wherein said substep for confirming that the electronic cash transfer is legally performed, the method comprising the substeps of:
    producing a medium value w' using the assigner's public key $p_{U1}$ and the challenge value in accordance with $w' = g^z p_{U1}^d \bmod p$; and
    verifying that the equation $c_{U1}^{e_B} \bmod n_B = h(w'\|\|p_{U1})$ is correct, $z^*_p$ being a mathematical notation which indicates a set of $\{1, 2, 3, \ldots, p-1\}$, p indicates a prime number, $g^z$ represents the multiplication of as many as r times, and z represents a response value.

56. The electronic cash transaction method in accordance with claim 47, wherein said substep for the payer's producing the challenge value and corresponding response value using the payee's account number, the transaction time and the vacant electronic cash message is performed in accordance with the following equations:

$$d' = h(A_s\|\text{time}'\|c_{U2,z})$$

$$z = (r^* + S_{U2}d') \bmod q,$$

wherein d' represents the challenge value, $A_s$ represents the payee's account number, time' represents the transaction time, $c_{U2,z}$ represents the vacant electronic cash message, $S_{U2}$ represents the payer's secret key, $h(\ )$ represents a one-way function, $r^*$ represents the multiplication of g as many as r times, and r is randomly selected from a set $\{1, \ldots, q\}$.

57. The electronic cash transaction method in accordance with claim 47, wherein said substep for the payee's confirming the validity of the response value comprises the substeps of:
    producing a challenge value d' using the payee's account number $A_S$, the transaction time and the vacant electronic cash message $c_{U2,z}$ in accordance with $d' = h(A_S\|\text{time}'\|c_{U2,z})$;
    producing a medium value w" using the challenge value d', the payer's public key $p_{U2}$, and the received response value z in accordance with $w'' = g^z p_{U2}^{d'} \bmod p$; and
    verifying that the equation $cu_{U2,z}^{e_B} \bmod n_B = h(w''\|p_{U2})$ is correct,
    wherein $c_{U2,z}$ represents the vacant electronic cash message, $e_B$ represents a public key of the bank apparatus and $h(\ )$ represents a one-way function.

* * * * *